United States Patent
Lee et al.

(10) Patent No.: US 9,649,809 B2
(45) Date of Patent: May 16, 2017

(54) WRINKLE DIFFUSER SYSTEM FOR COMPOSITES

(71) Applicant: The Boeing Company, Chicago, IL (US)

(72) Inventors: Tristan E. Lee, Tukwila, WA (US); Andrew M. Hopkins, Tukwila, WA (US); William T. Kline, Burien, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 14/222,617

(22) Filed: Mar. 22, 2014

(65) Prior Publication Data

US 2015/0044430 A1    Feb. 12, 2015

Related U.S. Application Data

(63) Continuation-in-part of application No. 13/668,210, filed on Nov. 2, 2012.

(51) Int. Cl.
*B29C 53/18*    (2006.01)
*B32B 38/18*    (2006.01)
(Continued)

(52) U.S. Cl.
CPC ............ *B29C 53/18* (2013.01); *B29C 33/42* (2013.01); *B29C 70/543* (2013.01); *B29C 70/56* (2013.01);
(Continued)

(58) Field of Classification Search
CPC ......... B29C 53/18; B29C 33/42; B29C 70/56; B29C 70/543; B32B 38/18; B32B 43/00;
(Continued)

(56) References Cited

U.S. PATENT DOCUMENTS

| 334,915 A | 1/1886 | Weddel |
| 2,967,796 A | 1/1961 | Raffel |

(Continued)

FOREIGN PATENT DOCUMENTS

EP    2433781    3/2012

OTHER PUBLICATIONS

Vanclooster, "On the formability of multi-layered fabric composites," Presented at ICCM-17 17th International Conference on Composite Materials, Jul. 27-31, 2009, Edinburgh, UK. available at <http://www.iccm-central.org/Proceedings/ICCM17proceedings/Themes/Manufacturing/COMPOSITES%20FORMING/C1.5%20van%20Clooster.pdf>.

(Continued)

*Primary Examiner* — Nahida Sultana

(57) ABSTRACT

A system for diffusing wrinkles in a composite laminate may include at least one wrinkle diffuser. The wrinkle diffuser may include a diffuser body may be mounted to a tool in a manner such that a composite ply at least partially overlaps the wrinkle diffuser. A plurality of diffuser elements may be formed in the diffuser body to define a corrugated surface. The corrugated surface may cause a portion of the composite ply to assume a corrugated shape when a compaction pressure is applied to force the composite ply against the corrugated surface. The wrinkle diffuser may include an indexing feature to index the wrinkle diffuser to a ply edge of the composite ply.

22 Claims, 26 Drawing Sheets

(51) Int. Cl.
 *B32B 43/00* (2006.01)
 *B29C 70/54* (2006.01)
 *B29C 70/56* (2006.01)
 *B29C 33/42* (2006.01)

(52) U.S. Cl.
 CPC .............. *B32B 38/18* (2013.01); *B32B 43/00* (2013.01); *Y10T 156/1002* (2015.01); *Y10T 156/1043* (2015.01); *Y10T 428/24628* (2015.01); *Y10T 428/24694* (2015.01)

(58) Field of Classification Search
 CPC ....... Y10T 156/1043; Y10T 428/24694; Y10T 428/24628; Y10T 156/1002
 USPC ....... 264/257, 285, 286; 156/196; 38/44, 70, 38/99, 100, 102
 See application file for complete search history.

(56) References Cited

U.S. PATENT DOCUMENTS

| | | | |
|---|---|---|---|
| 3,685,931 A * | 8/1972 | Craven | B29C 53/28 264/286 |
| 3,957,416 A | 5/1976 | Kaempen | |
| 3,995,081 A | 11/1976 | Fant | |
| 4,081,504 A | 3/1978 | Wenrick | |
| 4,475,976 A * | 10/1984 | Mittelstadt | B29C 70/342 100/211 |
| 4,498,943 A * | 2/1985 | Itoh | B31F 1/2813 156/164 |
| 5,686,038 A * | 11/1997 | Christensen | B29C 33/10 264/257 |
| 5,693,164 A * | 12/1997 | Chang | A41C 5/005 156/152 |
| 5,843,355 A | 12/1998 | McCarville | |
| 6,110,407 A | 8/2000 | Murphy | |
| 6,254,812 B1 * | 7/2001 | Goodridge | B29C 33/303 249/178 |
| 7,249,943 B2 | 7/2007 | Benson | |
| 7,717,694 B2 * | 5/2010 | Coleman | B29C 70/44 425/389 |
| 7,943,076 B1 | 5/2011 | Hawkins | |
| 9,272,767 B2 | 3/2016 | Stewart | |
| 2003/0033708 A1 * | 2/2003 | Aull | B01J 19/32 29/521 |
| 2005/0056362 A1 | 3/2005 | Benson | |
| 2009/0202767 A1 | 8/2009 | Booker et al. | |
| 2010/0201045 A1 | 8/2010 | Schibsbye | |
| 2013/0122263 A1 * | 5/2013 | Saleck | B32B 3/28 428/182 |
| 2014/0338242 A1 * | 11/2014 | Zhou | A47G 1/0633 40/774 |
| 2016/0016366 A1 | 1/2016 | Robins | |

OTHER PUBLICATIONS

PCT/US2013/063680 International Search Report dated Jan. 8, 2014.

\* cited by examiner

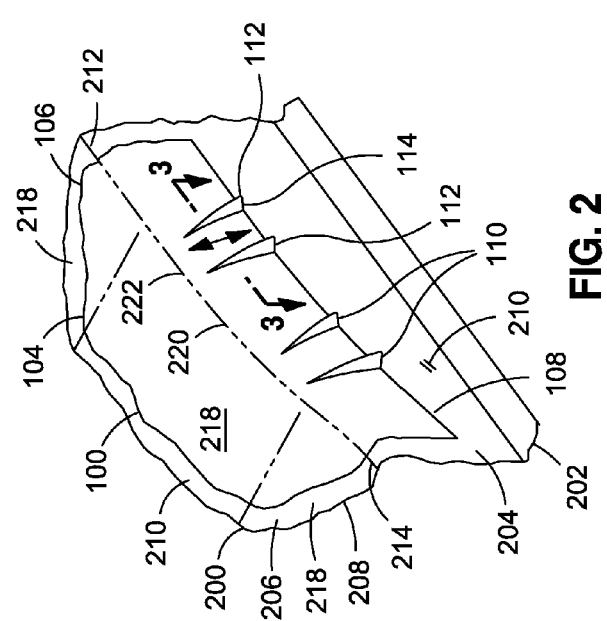
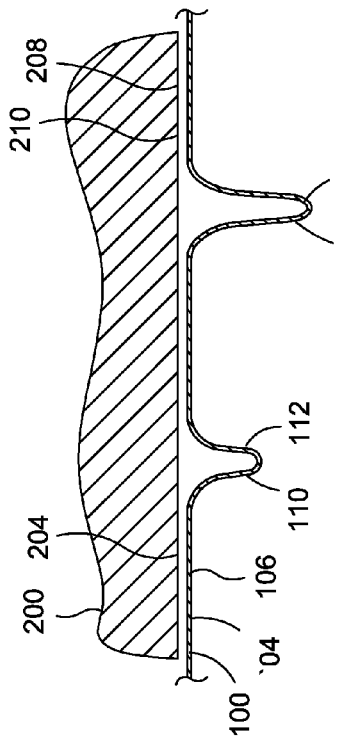
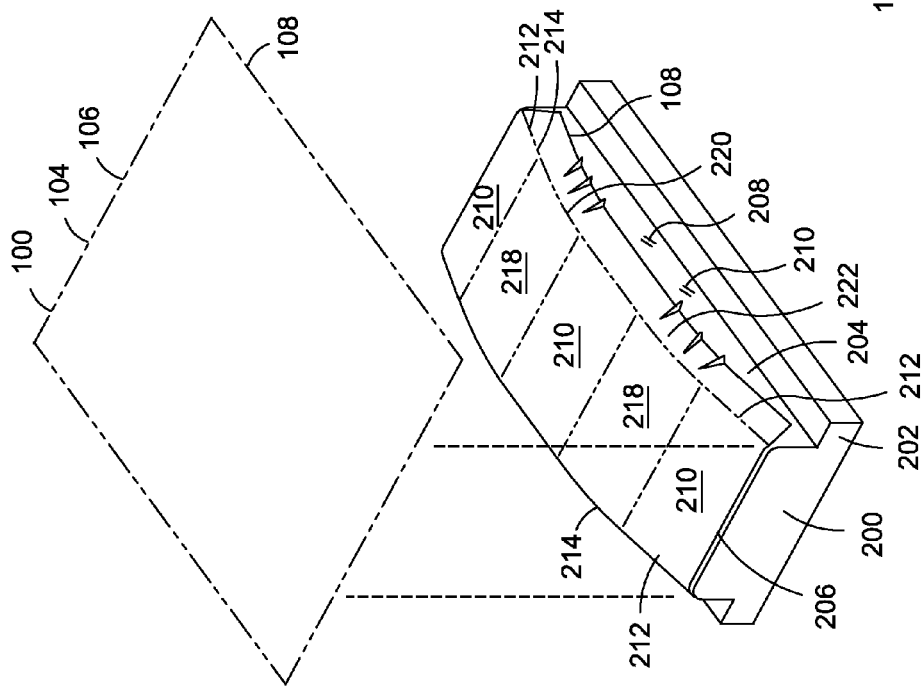

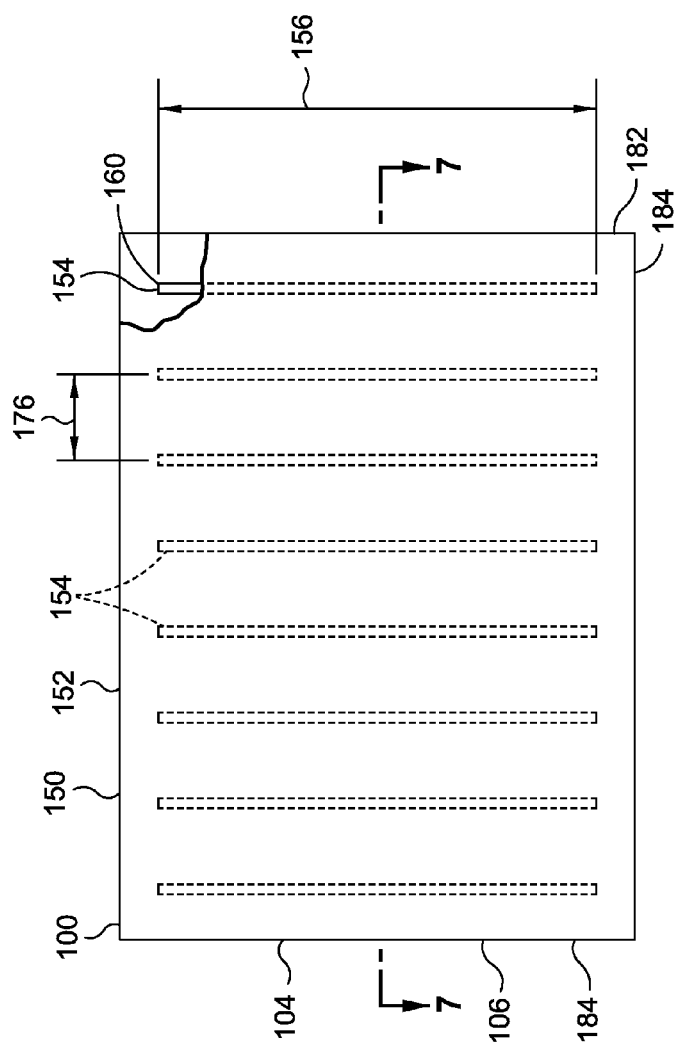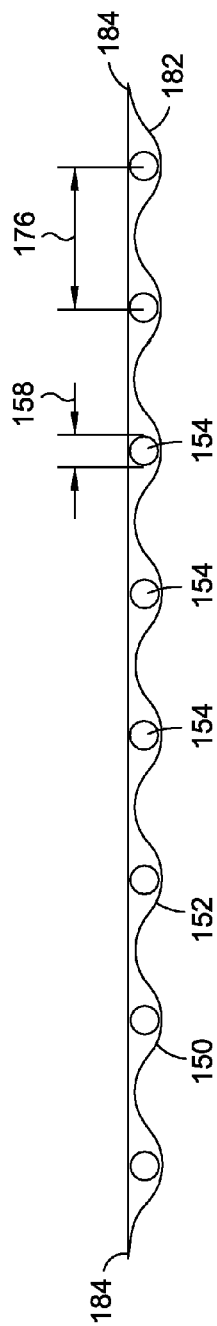

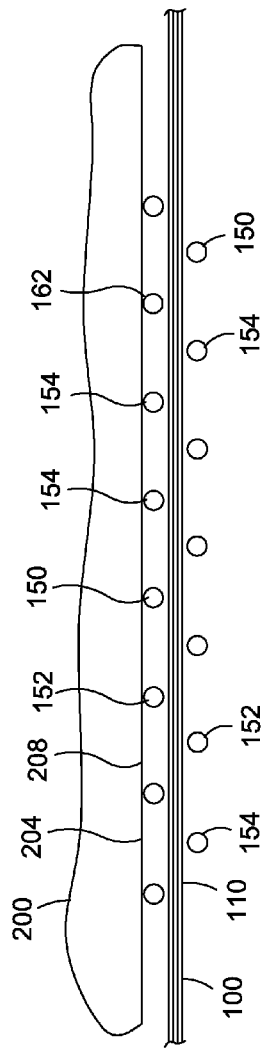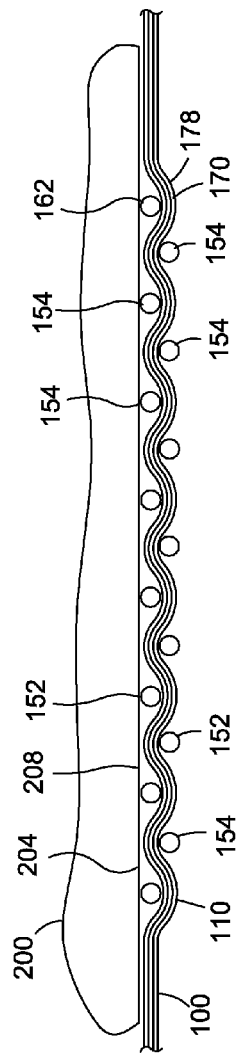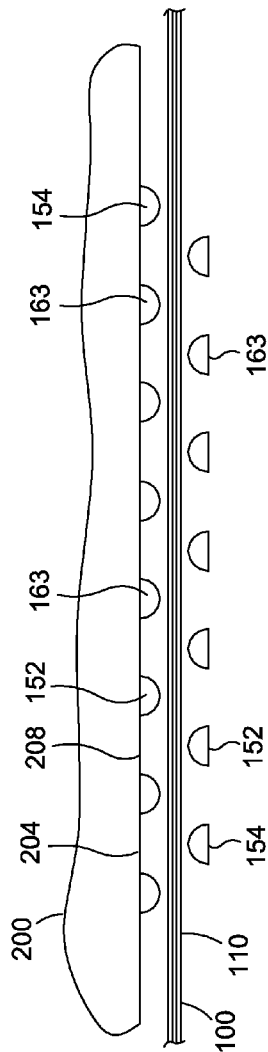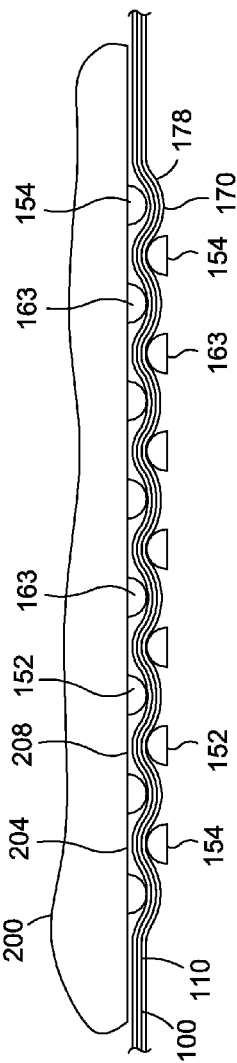

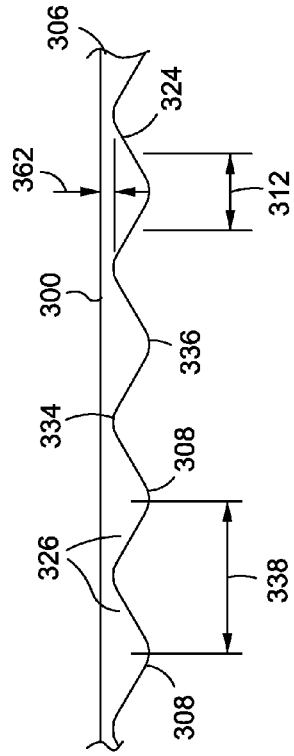
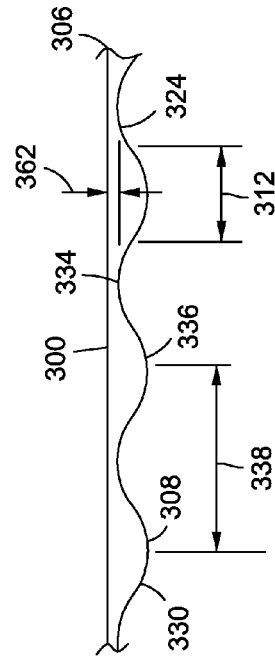
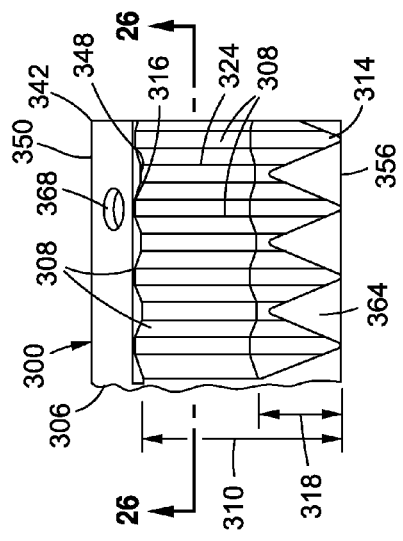
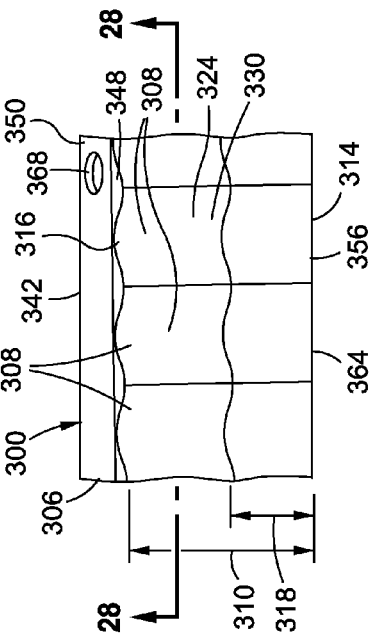

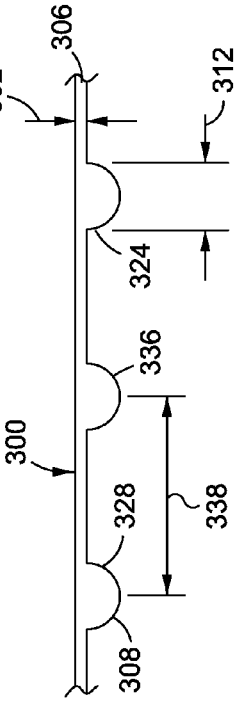
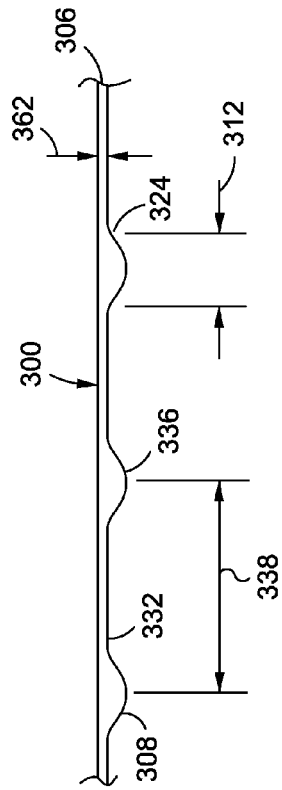
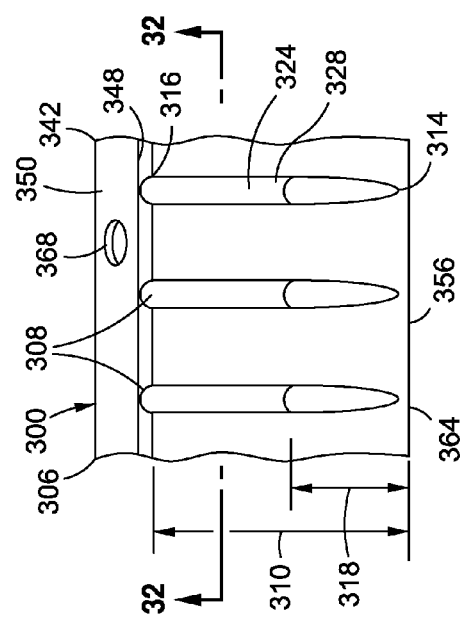
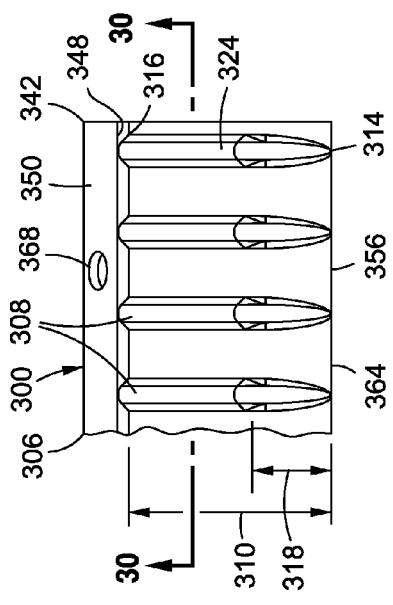
FIG. 29
FIG. 30
FIG. 31
FIG. 32

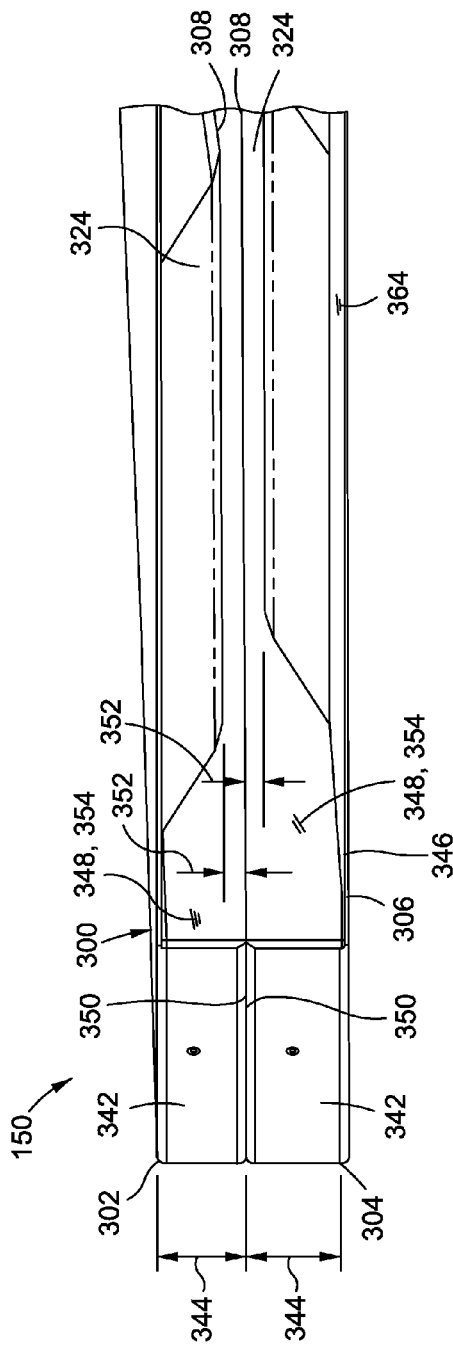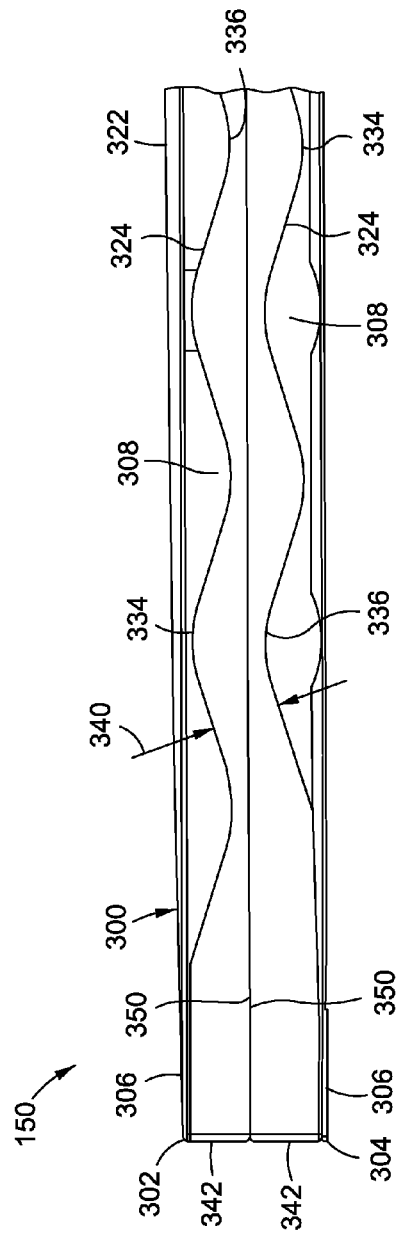

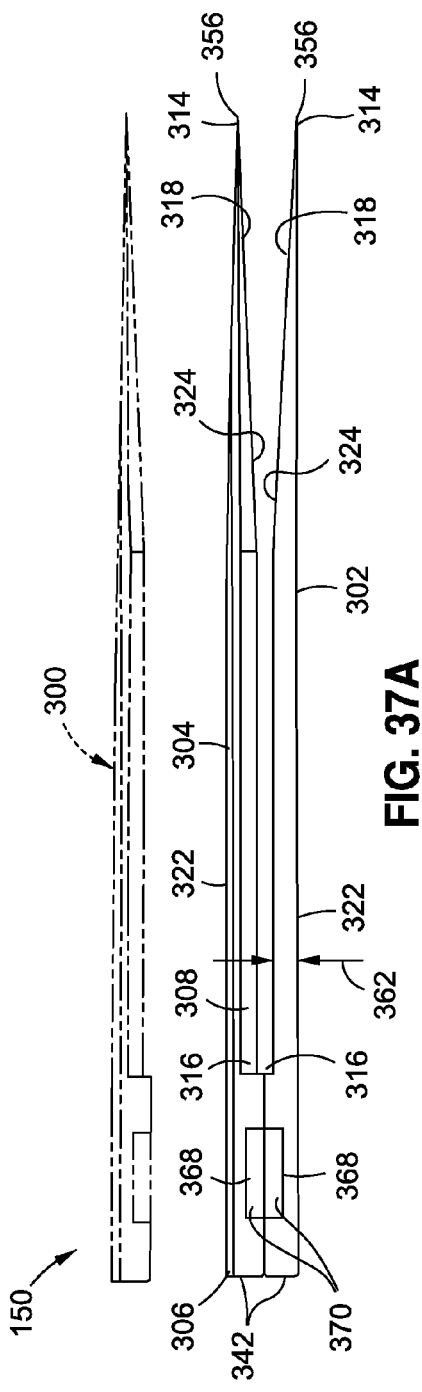
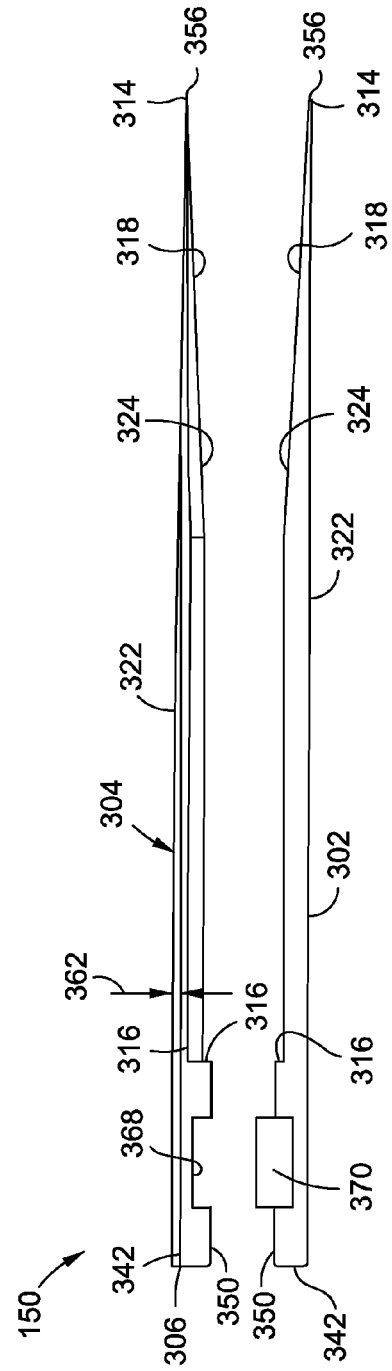
FIG. 37A
FIG. 37B

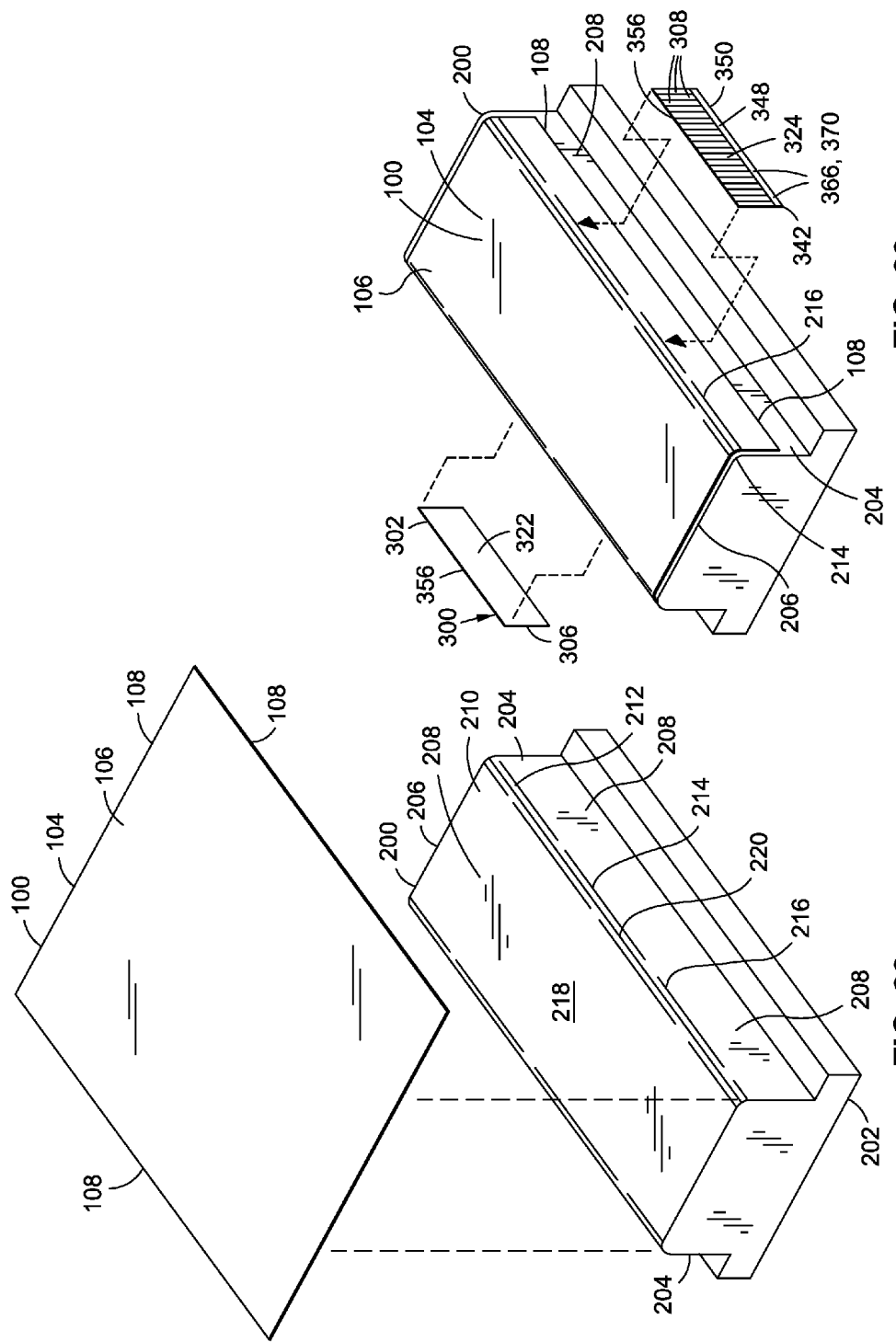

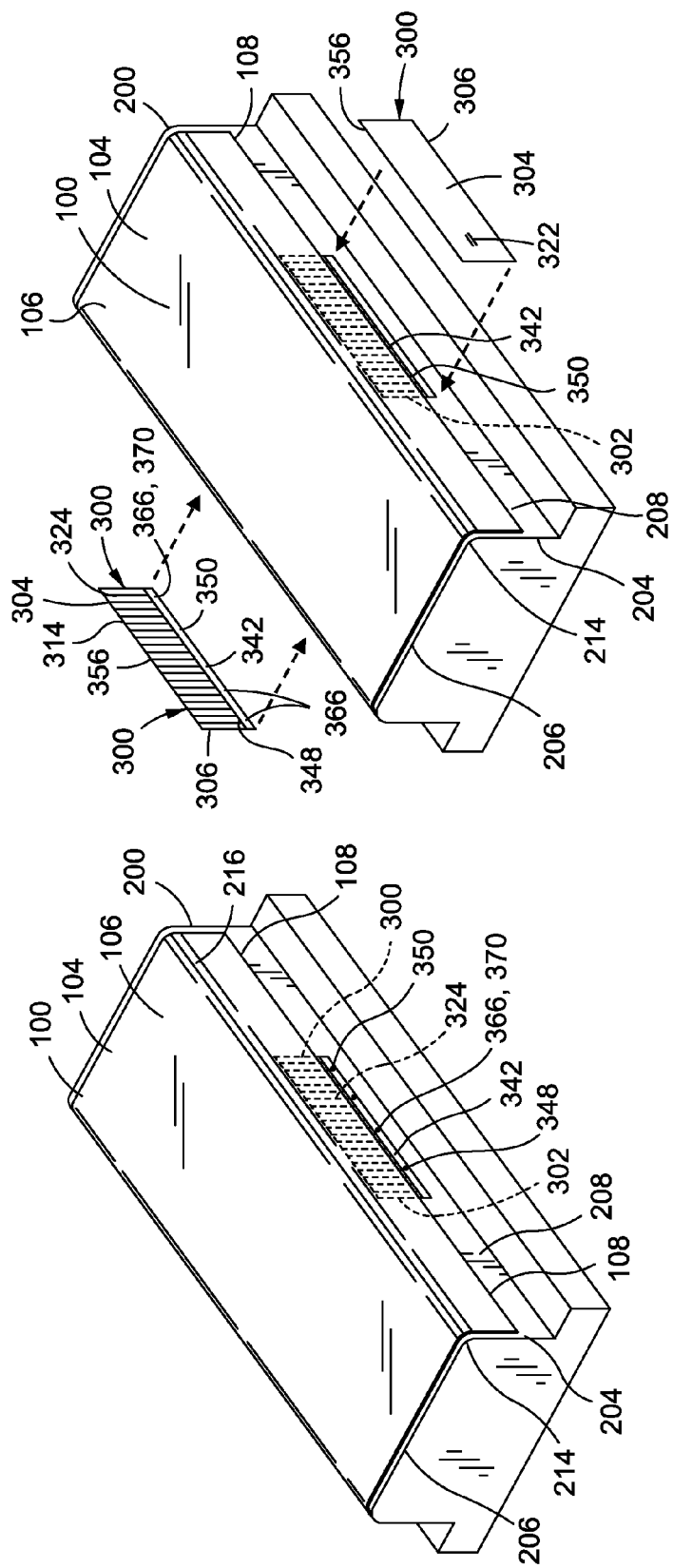

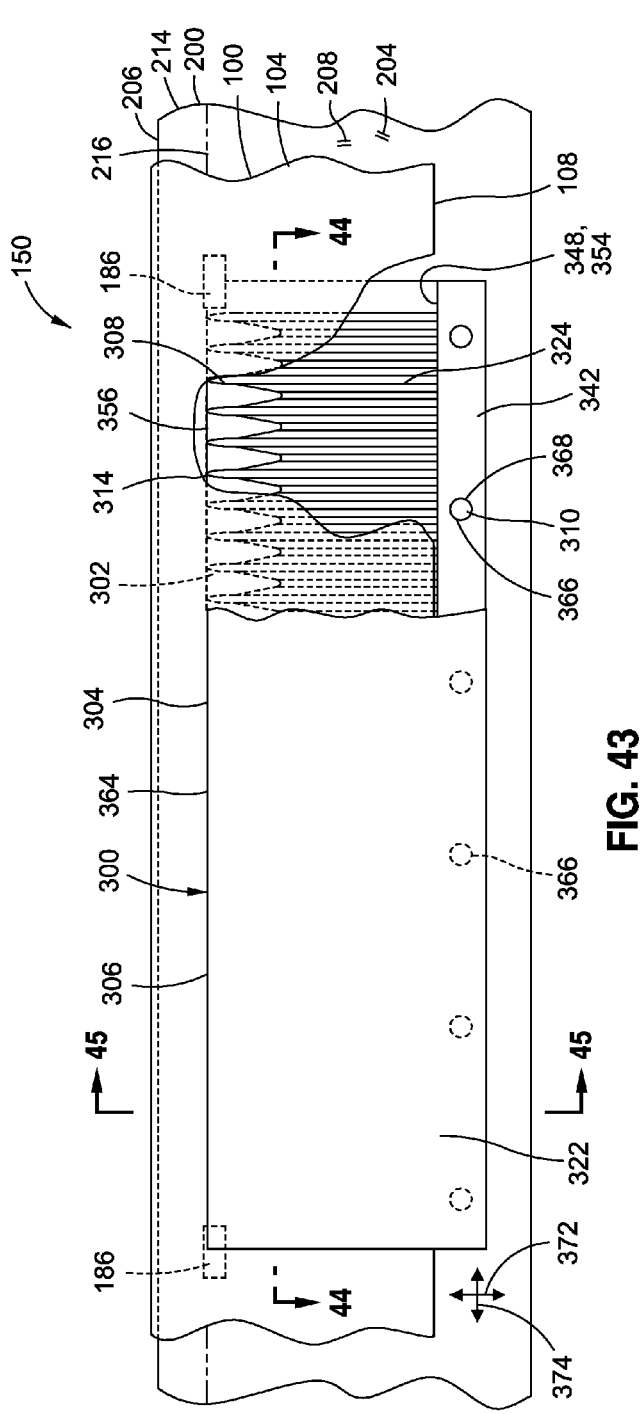
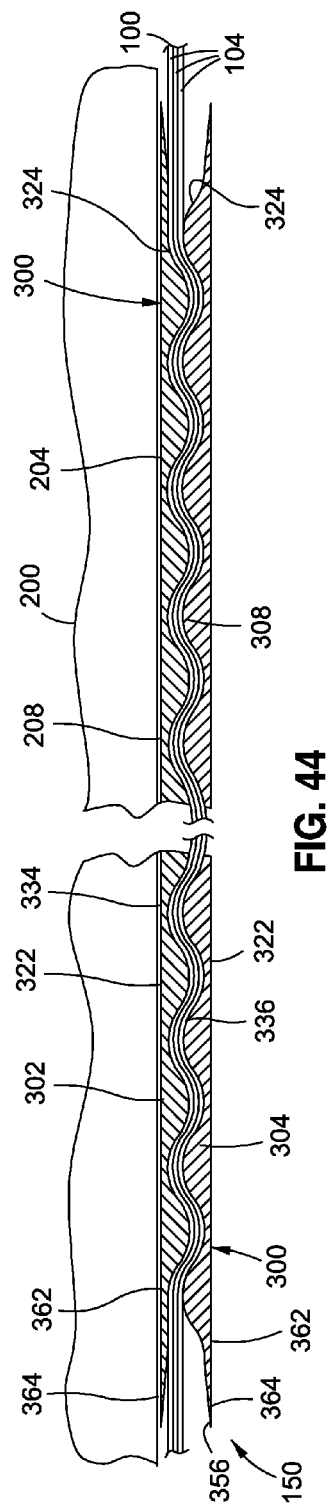
FIG. 43
FIG. 44

WRINKLE DIFFUSER SYSTEM FOR COMPOSITES

CROSS-REFERENCE TO RELATED APPLICATIONS

The present application is a continuation-in-part of and claims priority to pending U.S. patent application Ser. No. 13/668,210 entitled SYSTEM AND METHOD FOR MINIMIZING WRINKLES IN COMPOSITES filed on Nov. 2, 2012, the entire contents of which is incorporated by reference herein.

FIELD

The present disclosure relates generally to composites manufacturing and, more particularly, to forming composite material over a mold.

BACKGROUND

Composite structures are used in a wide variety of applications. In aircraft construction, composites are used in increasing quantities to form the fuselage, wings, and other components. During the process of forming a composite structure, one or more composite plies may be formed or draped over a tool surface. When a composite laminate is formed over a tool surface having an irregular geometric shape, excess ply material may build up at localized areas in the composite laminate. For example, excess ply material may occur in the composite laminate near regions of complex curvature on the tool surface.

The excess ply material may collect or bunch up resulting in uncontrolled wrinkle formation in the composite laminate. Areas of uncontrolled wrinkle formation in cured composite articles may require significant documentation and rework to bring the composite article to within design tolerances. In cases of excessive wrinkle formation, the composite article may be scrapped and a replacement article may be fabricated with a significant cost and schedule impact.

As can be seen, there exists a need in the art for a system and method for controlling wrinkling in composite laminates formed over tools having an irregular geometric shape or complex curvature.

SUMMARY

The above-noted needs associated with wrinkle formation in composite laminates are specifically addressed and alleviated by the present disclosure which provides a wrinkle mitigation system for controlling the formation of wrinkles in a composite ply. The system may include at least one tooling rod disposed against a tool surface at a location on the tool where a composite ply is configured to overlap the tooling rod. The tooling rod may have an elongated shape and may have a generally high rod length to rod width aspect ratio of 10 or more. The tooling rod may be oriented along a general direction of wrinkle formation in the composite ply. The tooling rod may have a rod width that results in the composite ply assuming a corrugated shape when compaction pressure is applied to the composite ply over the tooling rod.

In a further embodiment, disclosed is a wrinkle mitigation system for controlling the formation of wrinkles in a composite laminate. The system may include a tooling rod assembly that may be removably mounted to a tool surface at a location where a composite laminate is configured to overlap the tooling rod assembly. The tooling rods of the tooling rod assembly may have an elongated shape and may be generally parallel to one another and oriented generally along a general direction of wrinkle formation in the composite laminate. The tooling rods may have a rod width that results in the composite laminate assuming a corrugated shape when compaction pressure is applied to the composite laminate.

Also disclosed is a method for mitigating wrinkle formation in a composite ply. The method may include providing at least one tooling rod on a tool surface, and applying a composite ply over the tooling rod and the tool surface. The method may further include applying a compaction pressure to the composite ply, and forming the composite ply into a corrugated shape over the tooling rod.

In a further embodiment, disclosed is a system for diffusing wrinkles in a composite layup and which may include at least one wrinkle diffuser. The wrinkle diffuser may include a diffuser body may be mounted to a tool in a manner such that a composite ply at least partially overlaps the wrinkle diffuser. A plurality of diffuser elements may be formed in the diffuser body to define a corrugated surface. The corrugated surface may cause a portion of the composite ply to assume a corrugated shape when a compaction pressure is applied to force the composite ply against the corrugated surface. The wrinkle diffuser may include an indexing feature to index the wrinkle diffuser to a ply edge of the composite ply.

Also disclosed is a wrinkle mitigation system which may include an inner wrinkle diffuser and an outer wrinkle diffuser. The inner wrinkle diffuser may be mounted on a tool surface and may include a corrugated surface defined by a plurality of diffuser elements. The outer wrinkle diffuser may have a corrugated surface formed complementary to the corrugated surface of the inner wrinkle diffuser. The corrugated surface of the inner and outer wrinkle diffuser may define a gap that may be sized to receive a composite layup for forming a corrugated shape into the composite layup when a compaction pressure is applied thereto. The inner and/or outer wrinkle diffuser may include a coupling feature to removably couple the outer wrinkle diffuser to the inner wrinkle diffuser in alignment with one another such that peaks of the corrugated surface of the outer wrinkle diffuser are substantially aligned with troughs of the corrugated surface of the inner wrinkle diffuser. The inner and/or outer wrinkle diffuser may further include an indexing feature configured to index the inner and outer wrinkle diffuser to a ply edge of the composite ply.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of a composite tool having a composite ply draped over the tool;

FIG. 2 is a perspective view of the tool in an area of complex curvature and illustrating excess ply material resulting in uncontrolled wrinkle formation in the composite ply due to the complex curvature;

FIG. 3 is a sectional view of the composite ply taken along line 3 of FIG. 2 and illustrating the uncontrolled wrinkle formation;

FIG. 6 is a plan view of an embodiment of a wrinkle mitigation system comprising a tooling rod assembly having a plurality of tooling rods covered by a protective film;

FIG. 7 is a sectional view of the tooling rod assembly taken along line 7 of FIG. 6;

FIG. 18 is a sectional view of the tool illustrating a pair of the tooling rod assemblies and a composite laminate positioned therebetween;

FIG. 19 is a sectional view of the tool taken along line 19 of FIG. 17 and illustrating a corrugated shape generated in the composite laminate by the pair of tooling rod assemblies;

FIG. 20 is a sectional view of the tool illustrating a pair of the tooling rod assemblies having a half-cone shaped tooling rods and illustrating a composite laminate positioned between the tooling rod assemblies;

FIG. 21 is a sectional view of the tool illustrating a corrugated shape generated in the composite laminate by the half-cone shaped tooling rods;

FIG. 25 is a perspective view of a portion of a wrinkle diffuser composed of diffuser elements having a triangular cross-sectional shape;

FIG. 26 is a sectional view of a wrinkle diffuser taken along line 26 of FIG. 25 and illustrating the triangular cross-sectional shape of each diffuser element;

FIG. 27 is a perspective view of another example of a wrinkle diffuser composed of diffuser elements forming the corrugated surface in a sine wave cross-sectional shape;

FIG. 28 is a sectional view of a wrinkle diffuser taken along line 28 of FIG. 27 and illustrating the sine wave cross-sectional shape of the corrugated surface;

FIG. 29 is a perspective view of another example of a wrinkle diffuser composed of diffuser elements forming the corrugated surface in an extended sine wave cross-sectional shape;

FIG. 30 is a sectional view taken along line 30 of FIG. 29 and illustrating the extended sine wave cross-sectional shape of the corrugated surface;

FIG. 31 is a perspective view of a portion of a wrinkle diffuser composed of diffuser elements having a semi-circular cross-sectional shape;

FIG. 32 is a sectional view taken along line 32 of FIG. 31 and illustrating the semi-circular cross-sectional shape of each diffuser element;

FIG. 34 is a perspective view of an end of the coupled inner and outer wrinkle diffuser showing the base flanges coupled to one another;

FIG. 35 is a sectional view taken along line 35 of FIG. 34 and illustrating a constant gap formed between the opposing corrugated surfaces of the inner and outer wrinkle diffuser;

FIG. 37A is a sectional view taken along line 37A of FIG. 34 and illustrating a pair of magnets received within respective bores formed in respective base flanges of the inner and outer wrinkle diffuser;

FIG. 37B is a sectional view of an alternative embodiment of a coupling feature including a single magnet protruding outwardly from the base flange of the inner wrinkle diffusers for receipt within a bore formed in the base flange of the outer wrinkle diffuser;

FIG. 38 is a perspective view of a composite layup positioned above a tool having corner radii joining the tool surfaces on the top and the tool sides;

FIG. 39 is a perspective view of the composite layup draped over the tool and showing a pair of inner wrinkle diffusers prior to installation between the composite layup and the tool sides;

FIG. 40 is a perspective view of the inner wrinkle diffusers installed between the composite layup and the tool sides;

FIG. 41 is a perspective view of a pair of outer wrinkle diffusers prior to coupling to the respective pair of inner wrinkle diffusers;

FIG. 43 is a side view of the inner and outer wrinkle diffusers with the composite layup sandwiched therebetween;

FIG. 44 is a sectional view taken along line 44 of FIG. 43 and illustrating the composite layup sandwiched between the corrugated surfaces of the inner and outer wrinkle diffuser;

DETAILED DESCRIPTION

Figure 5:
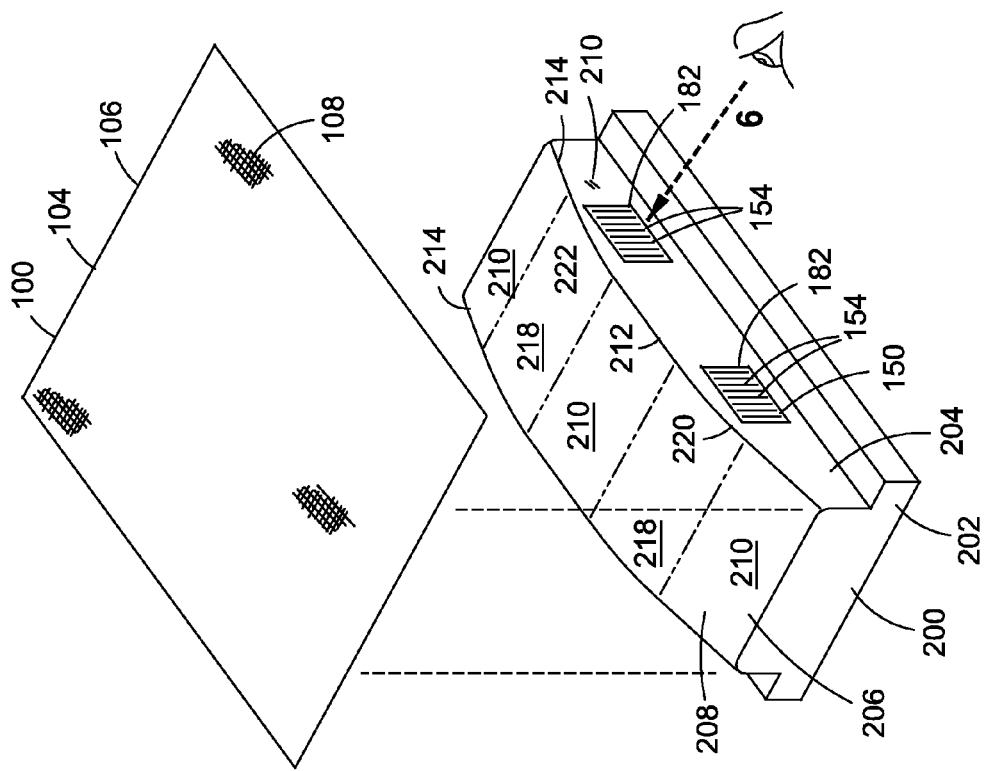
FIG. 5 is a perspective view of the tool with the wrinkle mitigation system mounted to the tool sides adjacent to locations of complex curvature in the tool surface.

Referring now to the drawings wherein the showings are for purposes of illustrating preferred and various embodiments of the disclosure, shown in FIG. 1 is a perspective view of a composite tool 200 having a composite ply 104 that may be applied over the tool 200. The composite ply 104 may be provided as a relatively flat or planar sheet of polymer matrix fiber-reinforced material 106. For example, the composite ply 104 may comprise pre-impregnated fiber-reinforced polymeric material (e.g., prepreg). However, the composite ply 104 may comprise a dry fiber preform (not shown) that may be infused with resin after the preform is applied to the tool 200.

The tool 200 may include a tool base 202 and tool sides 204 extending upwardly to a tool top 206. The tool top 206 and tool sides 204 may collectively include a plurality of tool surfaces 208 over which the composite ply 104 may be applied or formed. The tool 200 may include one or more irregularly shaped surfaces. For example, the tool 200 may include one or more planar surfaces 210 and one or more contoured surfaces 218. A contoured surface 218 may comprise a curved surface or a surface combining flats and curves. In an embodiment shown in FIG. 1, the contoured surface 218 may have a relatively large radius to provide a gradual transition between the angular orientations of the planar surfaces 210 located on opposing sides of the contoured surface 218. The juncture of the planar surfaces 210 with the planar tool sides 204 may represent a single curvature 212 in the tool 200. The juncture of the contoured surfaces 218 with the tool sides 204 may represent regions of complex curvature 220 or bi-directional curvature 222 in the tool 200.

Referring to FIG. 2, shown is a composite ply 104 or composite laminate 100 overlapping a portion of the tool 200 in a region of complex curvature 220. Regions of single curvature 212 are located on opposite sides of the region of complex curvature 220. When a relatively planar sheet of composite ply 104 material is formed over the regions of single curvature 212, the composite ply 104 material may generally lay flat against the tool side 204. When a planar sheet of composite ply 104 material is formed over a region of the complex curvature 220, excess ply material 110 may bunch up against the tool side 204.

Referring to FIG. 3, shown is a cross section of the tool 200 along the tool side 204 and illustrating excess ply material 110 that may occur in the composite ply 104. The excess ply material 110 may result in uncontrolled wrinkle formation 112. The uncontrolled wrinkle formation 112 may include localized bunching of the excess ply material 110 into folds or pleats of different heights. In addition, such folds or beads may be distributed non-uniformly along the composite ply 104. The fold or pleats may be oriented along a direction of wrinkle formation 4 that is generally parallel to the direction over which the composite play 104 is wrapped over the tool surfaces 208.

For example, FIG. 2 illustrates the uncontrolled wrinkle formation 112 comprising pleats of excess material having a lengthwise direction that is generally parallel to the direction of the wrapping of the composite ply 104 over the contoured surface 218 and the tool side 204. For the tool 200 configuration shown, the direction of wrinkle formation 114 may be perpendicular to a length along which a corner radius 214 extends between the contoured surface 218 and the tool side 204. In this regard, FIGS. 1-3 illustrate the generation of excess ply material 110 that may occur when a generally flat or planar composite ply 104 is formed over a surface of complex curvature 220 or irregular geometric shape. However, excess ply material may be generated with any tool configuration having a complex curvature of irregular geometric shape.

Figure 4:
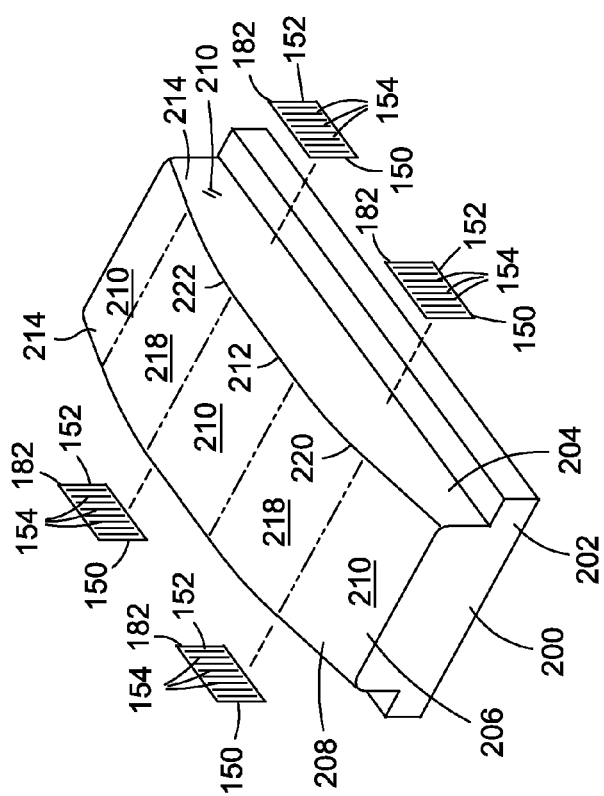
FIG. 4 is an exploded perspective view of the tool and a wrinkle mitigation system prior to mounting to the tool.

Referring to FIG. 4, shown is a wrinkle mitigation system 150 that may be applied to or mounted to a tool 200 prior to forming or applying a composite ply 104 over the tool 200. The wrinkle mitigation system 150 may comprise one or more tooling rods 154 that may be disposed against or mounted to one or more tool surfaces 208. For example, the wrinkle mitigation system 150 may comprise one or more tooling rod assemblies 152 that may be applied to a tool surface 208. Each one of the tooling rod assemblies 152 may include a plurality of tooling rods 154. Advantageously, the tooling rod assemblies 152 may uniformly distribute excess ply material 110 along a length of the composite ply 104, and may minimize or eliminate localized bunching of the excess ply material 110 into uncontrolled pleats or folds. As described below, the excess ply material 110 may be uniformly distributed when compaction pressure 228 is applied to the composite ply 104 and which may force the composite ply 104 over and in between the tooling rods 154. The compaction pressure 228 may cause the composite ply 104 to assume a corrugated shape 170 over the tooling rods 154.

Referring to FIG. 5, shown is the tool 200 with tooling rod assemblies 152 mounted to the tool sides 204. One or more of the tooling rod assemblies 152 may be disposed against a tool surface 208 at a location where a composite ply 104 is configured to overlap the tooling rod 154. One or more tooling rods 154 or tooling rod assemblies 152 may be positioned at a location on the tool 200 where excess ply material 110 may otherwise gather in an uncontrolled wrinkle formation 112 as described above. For example, one or more tooling rod assemblies 152 may be located adjacent to a region of complex curvature 220 on the tool 200. However, tooling rod assemblies 152 may be positioned at any location on the tool 200 and are not limited to regions of complex curvature 220.

In FIG. 5, a tooling rod 154 or a tooling rod assembly 152 may be removably mounted to the tool 200 such as by using a removable attachment device 186 such as an adhesive tape. However, one or more tooling rods 154 or tooling rod assemblies 152 may be permanently mounted to the tool 200. For example, one or more tooling rods 154 or tooling rod assemblies 152 may be integrally-formed with the tool 200. Although not shown, an integrally-formed tooling rod 154 or tooling rod assembly 152 may be machined into one or more tool surfaces 208 at a location on the tool 200 where excess ply material 110 is known to occur. In a further embodiment not shown, one or more tooling rods 154 or tooling rod assemblies 152 may be molded into a tool 200. For example, one or more composite tooling rods 154 may be molded into a tool 200 formed of composite material.

Referring to FIG. 6, shown is an embodiment of a wrinkle mitigation system 150 comprising a tooling rod assembly 152. The tooling rod assembly 152 includes a plurality of tooling rods 154. Although the tooling rod assembly 152 is shown having eight (8) tooling rods 154, any number of tooling rods 154 may be included in the tooling rod assembly 152. In an embodiment, the tooling rods 154 of the tooling rod assembly 152 may be oriented generally parallel to one another. However, the tooling rods 154 may be oriented at any angle relative to one another for mitigating uncontrolled wrinkle formation 112. Advantageously, the wrinkle mitigation system 150 disclosed herein may be applied to any surface over which a composite ply 104 may be formed, and is not limited to tools for forming, consolidating, and/or curing composite plies 104.

In FIG. 6, each tooling rod 154 may have an elongated shape and may be oriented along a direction that is generally parallel to uncontrolled wrinkle formation 112 in the composite ply 104 as indicated above. Each one of the tooling rods 154 has a rod width 158 (e.g., a diameter) and a rod length 156 extending between opposing rod ends 160 of the tooling rod 154. The tooling rod 154 may be provided in a rod width 158 and/or rod length 156 that results in the composite ply 104 assuming a substantially uniform corrugated shape 170 when compaction pressure 228 is applied to the composite ply 104 against the tooling rod 154. Each tooling rod 154 may preferably be formed of a relatively lightweight, low-cost material that may be formed in the desired shape. For example, the tooling rods 154 may be formed of metallic material, composite material, polymeric material, ceramic material, wood, or any other material or combination of materials.

In FIG. 6 a tooling rod 154 or a tooling rod assembly 152 may be covered by a protective film 182 to act as a barrier between the tooling rod 154 and the composite material and prevent adhesion therebetween. In an embodiment, the protective film 182 may comprise a single layer of film such as a polymer layer between the tooling rod 154 and composite ply 104. In an embodiment, the polymer layer may be chemically non-reactive with the composite ply material. For example, the polymer layer may be formed of relatively thin layer (e.g., 1 millimeter) of silicone or the polymer layer may be formed as a thin layer of fluorinated ethylene propylene (FEP), commercially available as Teflon™. In an embodiment, the protective film 182 may be configured to substantially encapsulate the tooling rod assembly 152. The protective film 182 may have film edges 184 that may function as a border for the tooling rod assembly 152 to facilitate mounting the tooling rod assembly 152 to the tool 200 such as by taping the film edges 184 to a tool surface 208.

Referring to FIG. 7, shown is a sectional view of the tooling rod assembly 152 encapsulated within a protective film 182. The protective film 182 may be configured such that the tooling rods 154 are sandwiched between layers of the protective film 182 on opposite sides of the tooling rod assembly 152. The protective film 182 may be configured such that the film edge 184 extends above and below the rod ends 160 of the tooling rods 154. The film edges 184 may be sealed together such as by adhesive bonding, heat welding, or any other means for bonding the film edges 184 together. The protective film 182 may maintain the tooling rods 154 at a desired rod spacing 176 within the tooling rod assembly 152.

As described below, the tooling rods 154 may be spaced apart from one another at a rod spacing 176 that results in a substantially uniform distribution of excess ply material 110 in the composite ply 104. The tooling rods 154 may be oriented generally parallel to one another and may be positioned at a rod spacing 176 of between approximately 0.50 and 3.0 inch, although rod spacings 176 outside of the 0.50-3.0 inch range are contemplated. In this regard, the rod spacing 176 may be dictated by the amount of excess ply material 110 that may be measured, predicted, or calculated to occur at a given location on the tool 200.

In an embodiment, the tooling rods 154 may also be spaced apart from one another at non-uniform spacings. For example, to accommodate a fastener installation through the cured composite ply 104, the spacing between one pair of tooling rods 154 may be increased relative to the spacing between the remaining pairs of tooling rods 154. The increased spacing between the pair of tooling rods 154 may be provided to ensure that the composite material will be forced into contact with the tool surface 208 during curing of the composite ply 104. In this manner, the cured composite article will be in contact with the surface of a mating component such as at a fastener installation.

Figure 8:
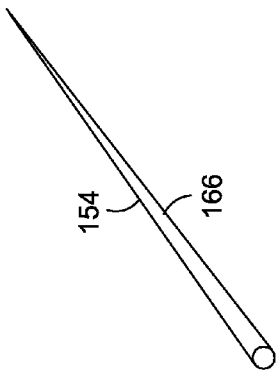
FIG. 8 is a perspective view of an embodiment of a tooling rod having a cylindrical shape.

Referring to FIG. 8, shown is an embodiment of a generally elongated tooling rod 154 having a cylindrical shape 162. The tooling rod 154 has a rod length 156 extending between rod ends 160 as indicated above. Although illustrated as having a generally straight shape, the tooling rods 154 may be provided in a curved shape (not shown) that may be formed complementary to the tool surface 208 to which the tooling rod 154 may be mounted. The tooling rods 154 each may have a rod width 158 or rod diameter. The rod width 158 may be dictated in part by the amount of excess ply material 110 that may occur at a given tool 200 location.

Although the tooling rods 154 in the figures are shown as having a generally high rod length 156 to rod width 158 aspect ratio of at least approximately 10, the tooling rods 154 may be provided in relatively low aspect ratio. Although not shown, the tooling rods 154 may also be provided as tooling rod segments. In an embodiment, such tooling rod segments may be disposed in end-to-end relationship with one another. Furthermore, although each one of the tooling rods 154 is shown having substantially equivalent rod widths 158 or rod diameters, tooling rods 154 of non-uniform diameter may be included in a tooling rod assembly 152.

Figure 9:
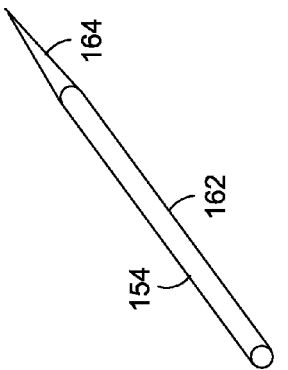
FIG. 9 is a perspective view of an embodiment of a cylindrical tooling rod having a tapered rod end.
Figure 15:
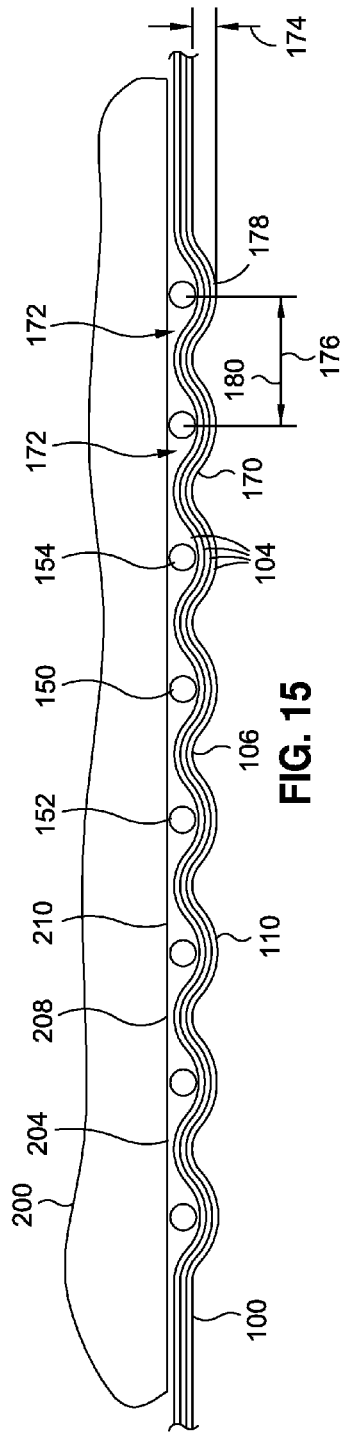
FIG. 15 is a sectional view of the tool taken along line 15 of FIG. 14 and illustrating a corrugated shape generated in the composite laminate by the tooling rod assembly.
Figure 16:
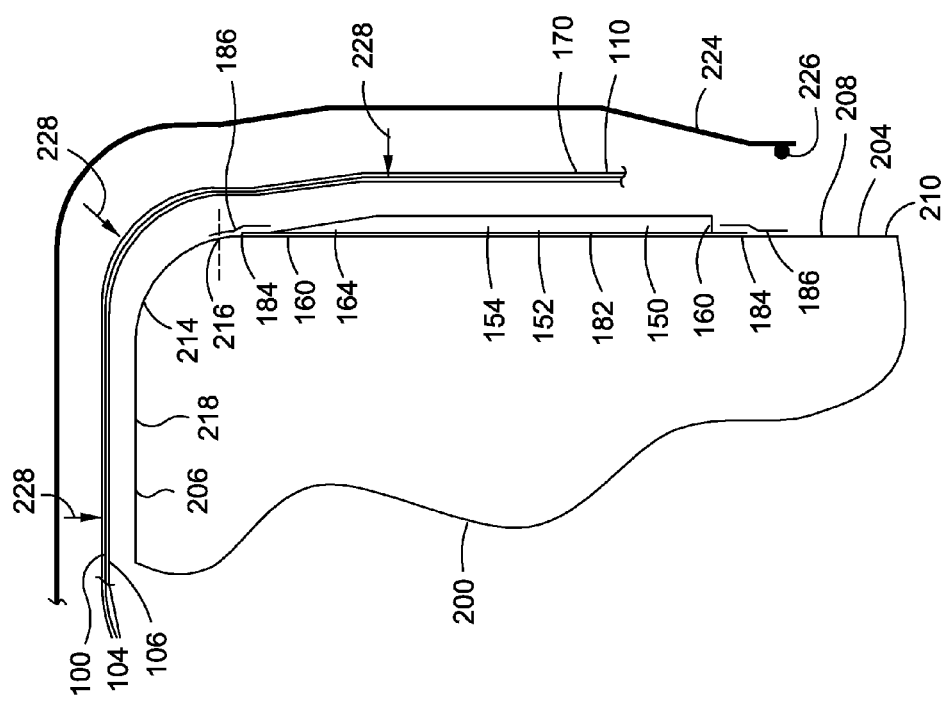
FIG. 16 is an exploded sectional side view of a composite laminate draped over the tool and partially covering the tooling rod assembly.

Referring to FIG. 9, shown is an embodiment of a tooling rod 154 having a cylindrical shape 162 with a tapered rod end 164. The tapered rod end 164 may facilitate a gradual transition of excess ply material 110 into a substantially uniform corrugated shape 170 of the composite ply 104 as illustrated in FIG. 15. In an embodiment, tooling rods 154 with tapered rod ends 164 may be positioned against the tool surface 208 such that the tapered rod end 164 is located adjacent to a corner radius 214 of the tool 200. For example, FIG. 16 illustrates a tapered rod end 164 of the tooling rod 154 disposed adjacent to a tangent 216 of the corner radius 214 in the tool surface 208.

Figure 10:
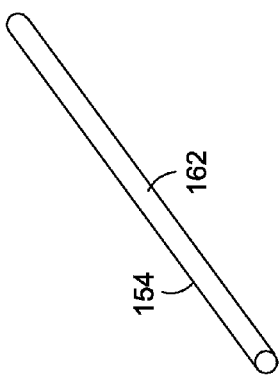
FIG. 10 is a perspective view of an embodiment of a tooling rod having a tapered shape extending along the rod length.

Referring to FIG. 10, shown is an embodiment of a tooling rod 154 having a tapered shape 166 or conical shape extending along a substantial portion of the rod length 156. The smaller diameter or pointed end of the tapered shape 166 may be positioned adjacent to the corner radius 214 of the tool surface 208. As indicated above, such a tapered shape 166 of the tooling rod 154 may facilitate a gradual transition of the excess ply material 110 into a substantially uniform corrugated shape 170.

Figure 11:
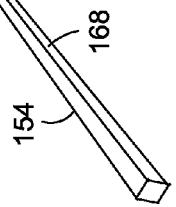
FIG. 11 is a perspective view of an embodiment of a tooling rod having a half-cone shape.
Figure 22:
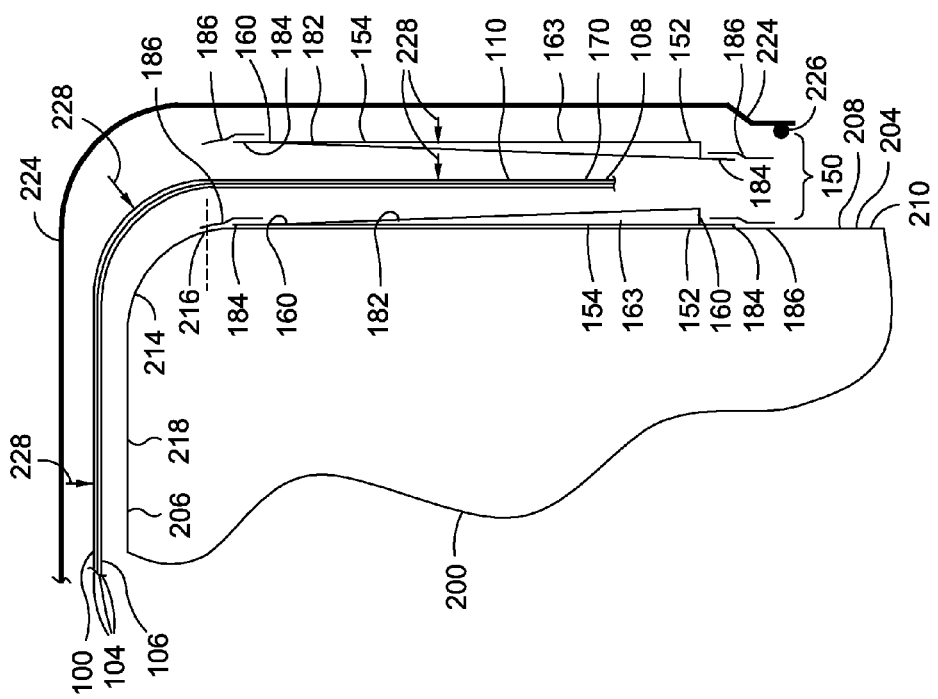
FIG. 22 is an exploded sectional side view of a composite laminate draped over the tool and positioned between a pair of tooling rod assemblies.

Referring to FIG. 11, shown is an embodiment of a tooling rod 154 having a half-cone shape 163 extending along a substantial portion of the rod length 156. The smaller end or pointed end of the half-cone shape 163 may be positioned adjacent to a corner radius 214 of the tool surface 208 as shown in FIG. 22 and described below. In any one of the tooling rod assembly embodiments disclosed herein, a pair of tooling rod assemblies may be positioned to sandwich the composite ply such that the tooling rods of one of the tooling rod assemblies nests in the space between the tooling rods of the a pose Ing tooling rod assembly as described below.

Figure 12:
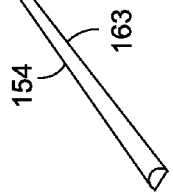
FIG. 12 is a perspective view of an embodiment of a tooling rod having a pyramidal shape.

Referring to FIG. 12, shown is an embodiment of a tooling rod 154 having a pyramidal shape 168 extending between the rod ends 160. The pyramidal shape 168 may facilitate the mounting of the tooling rods 154 against a generally flat or planar tool surface 208. In addition, the pyramidal shape 168 of the tooling rod 154 may have reduced manufacturing costs relative to the cost of manufacturing a conical or tapered tooling rod.

Figure 13:
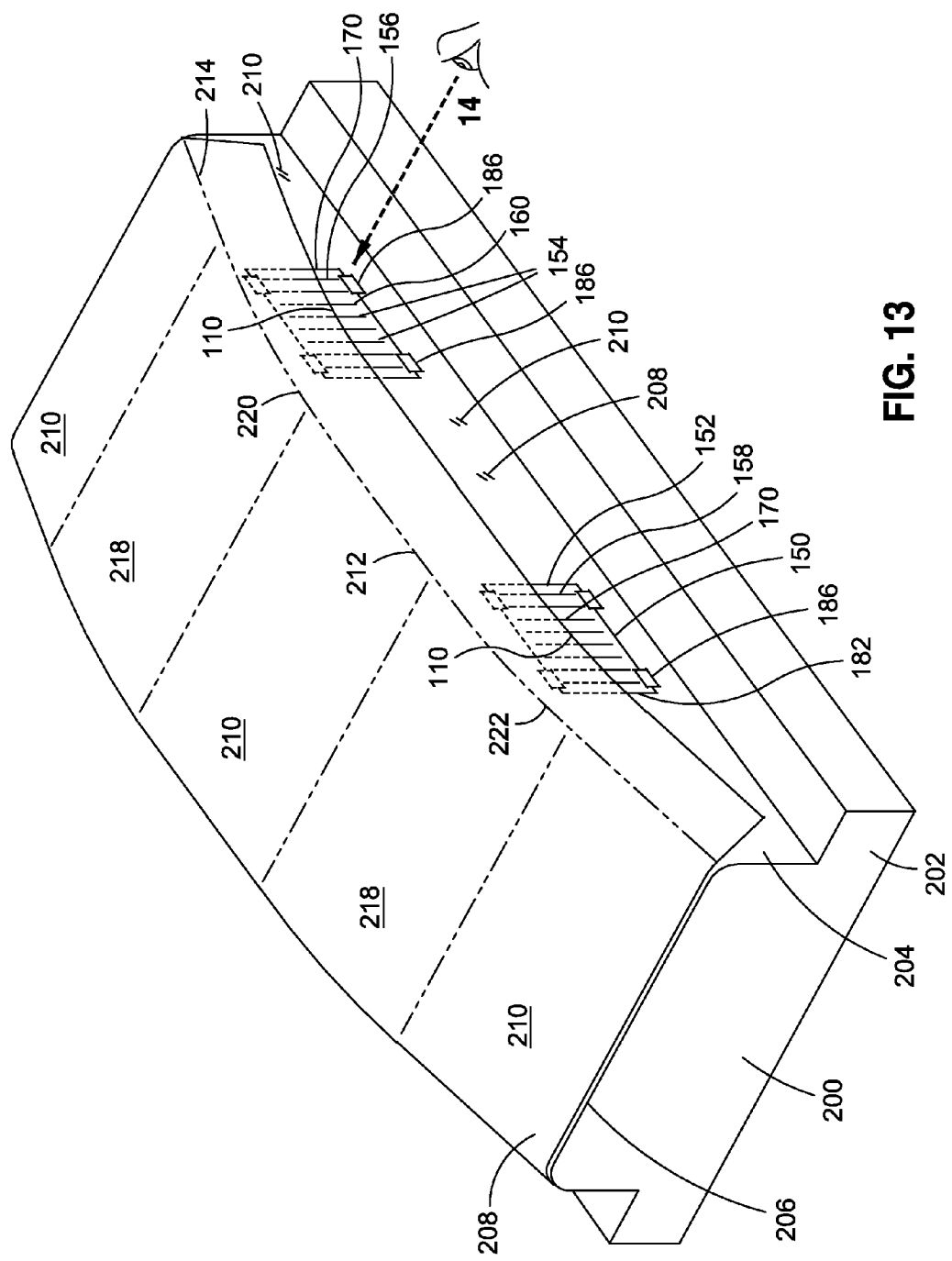
FIG. 13 is a perspective view of a composite laminate draped over a tool and partially covering the tooling rod assemblies that are mounted to the tool sides.

Referring to FIG. 13, shown is the tool 200 having a composite ply 104 or composite laminate 100 formed over the tool 200 such that the composite ply 104 at least partially covers the tooling rod assemblies 152. Each one of the tooling rod assemblies 152 may be mounted on the tool 200 proximate a region of complex curvature 220 in the tool surface 208. Although a single tooling rod assembly 152 is mounted proximate each region of complex curvature 220, a plurality of tooling rod assemblies 152 may be mounted in each region of complex curvature 220. For example, although not shown, two of the tooling rod assemblies 152 may be positioned in side-by-side relationship to one another on a tool surface 208 proximate a region of complex curvature 220. The sides of the tooling rod assemblies 152 may be spaced apart from one another such that the cured composite article includes a non-corrugated region in the space between the tooling rod assemblies 152 such as to accommodate a fastener installation or to provide a flat surface on the cured composite article for mating to another component (not shown).

Figure 14:
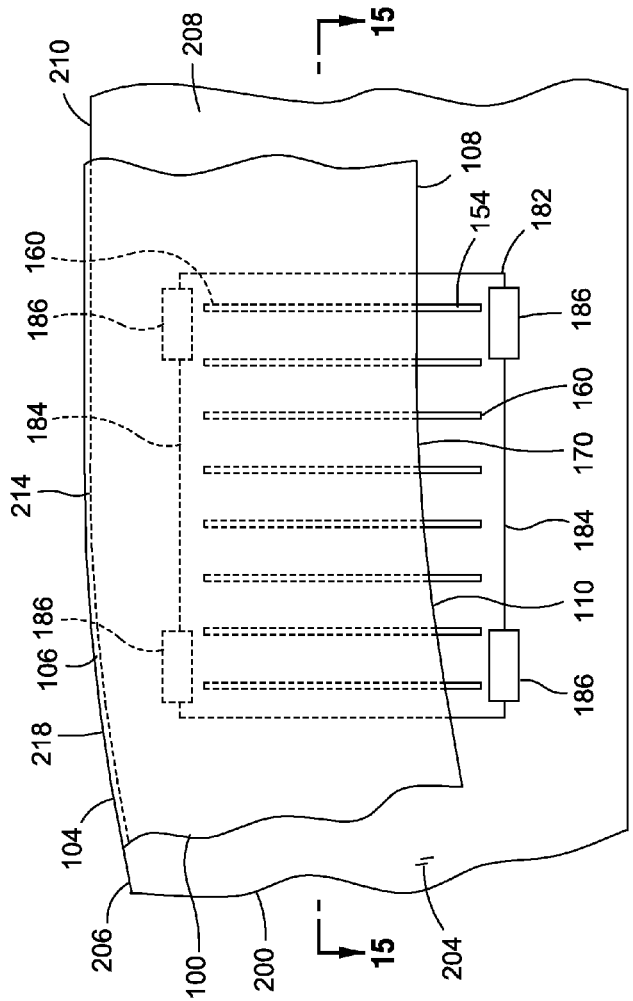
FIG. 14 is a side view of a tooling rod assembly mounted to the tool and illustrating a composite laminate partially covering the tooling rod assembly.

Referring to FIG. 14, shown is a side view of a tooling rod assembly 152 mounted to the tool 200 and illustrating a composite laminate 100 partially covering the tooling rod assembly 152. The tooling rod assembly 152 may be mounted to the tool surface 208 by means of one or more attachment devices 186. In an embodiment, the attachment devices 186 may comprise a removable attachment device 186 such as pressure-sensitive adhesive tape. One or more strips of pressure-sensitive adhesive tape such as polymeric tape may be applied over the film edges 184 of the protective cover to releasably secure the tooling rod assembly 152 to the tool 200. However, the attachment device 186 may be provided in any configuration and is not limited to pressure-sensitive adhesive tape. For example, the attachment device 186 may comprise a mechanical feature (not shown) that may be formed into the tool surface 208 and which may be configured to engage a mating mechanical feature (not shown) that may be included with the tooling rods 154 or tooling rod assemblies 152 or which may be integrated with the protective film 182 that may cover or encapsulate a plurality of tooling rods 154 of a tooling rod assembly 152.

In FIG. 14, the tooling rod assemblies 152 are shown positioned on the tool surface 208 such that the composite ply 104 at least partially overlaps the tooling rods 154. In this regard, one or more of the tooling rods 154 in a tooling rod assembly 152 may have a rod length 156 such that a portion of the tooling rod 154 extends outwardly beyond a ply edge 108 of the composite ply 104. Positioning the tooling rods 154 such that the rod and extend below the ply edge 108 may facilitate forming the corrugated shape 170 in the area of the ply edge 108 where the greatest amount of excess material may occur. However, the tooling rod assembly 152 may be positioned on the tool 200 such that the ply edge 108 extends below (not shown) the rod ends 160. In addition, the tooling rod assemblies 152 may also be positioned on the tool 200 such that the rod ends 160 of the tooling rods 154 are located adjacent to the area in the composite ply 104 where excess ply material 110 starts forming. In this regard, the tooling rod assemblies 152 may be positioned such that the rod ends 160 are located within approximately one inch of a tangent 216 of a corner radius 214 in the tool surface 208 as shown in FIG. 16.

Referring to FIG. 15, shown is a sectional view of the tool 200 illustrating the corrugated shape 170 that may be formed in a composite ply 104 or composite laminate 100 by the tooling rod assembly 152. The corrugated shape 170 may include relatively small channels 172 (FIG. 15) where the composite ply 104 overlaps and/or surrounds each one of the tooling rods 154. The corrugated shape 170 of the composite ply 104 or laminate may be defined by the spacing between the tooling rods 154 and the size of the tooling rod 154 (e.g., the rod widths 158). In an embodiment, one or more of the tooling rods 154 may have a rod width 158 (e.g., a rod diameter) in the range of from approximately 0.050 to 0.25 inch. For example, a tooling rod assembly 152 may be provided with tooling rods 154 each having a rod diameter of between approximately 0.10 inch and 0.20 inch. However, the rod widths 158 may be dictated in part by the amount of excess ply material 110 that may occur at a given tool 200 location, as mentioned above. Although not shown in FIG. 15, the tooling rods 154 may be encapsulated within a protective film 182. Alternatively, the tooling rods 154 may be separately mounted to the tool 200 (not shown), and a separate layer or sheet of protective film (not shown) may be positioned between the tooling rods 154 and the composite ply 104.

In FIG. 15, the tooling rods 154 may be positioned relative to one such that the corrugated shape 170 comprises a sine wave formation 178 in the composite ply 104. In this regard, the tooling rods 154 may be sized and configured such that the corrugated shape 170 has a substantially uniform wavelength 180. In addition, the tooling rods 154 may be sized and configured to provide a substantially uniform peak-to-peak amplitude 174 within the corrugated shape 170 of the composite ply 104. Advantageously, the tooling rod 154 quantity, rod spacing 176, and rod width 158 may be selected to minimize the peak-to-peak amplitude 174 within the corrugated shape 170 of a composite ply 104. For example, a tooling rod assembly 152 may be provided with a quantity of tooling rods 154 that are sized and configured to provide a peak-to-peak amplitude 174 in the corrugated shape 170 of less than approximately 0.10 inch. By minimizing the peak-to-peak amplitude 174 in the corrugated shape 170, distortion in the fiber reinforcement of the cured composite article may be minimized which may improve the strength and stiffness of the cured composite article. The peak-to-peak amplitude 174 may be defined as the vertical distance between a trough and an adjacent peak of one of the composite plies 104 of the cured composite article.

The wrinkle mitigation system 150 and method disclosed herein may be implemented in the process of forming composite materials of any type. For example, the composite materials may include polymer matrix fiber-reinforced material 106. Such polymer matrix fiber-reinforced material 106 may include carbon fibers, glass fibers, ceramic fibers, and other types of fibers configured in a unidirectional arrangement, a woven arrangement, a chopped fiber arrangement, or any one of a variety of other fiber arrangements. The polymer matrix fiber-reinforced material 106 may include a polymer matrix such as a thermosetting matrix or a thermoplastic matrix. The polymer matrix may comprise epoxy, polyester, phenolic, ceramic, or other matrix materials. The polymer matrix fiber-reinforced material 106 may comprise a dry fiber preform that may be applied over a tool 200 followed by the introduction of resin into the dry fiber preforms by a resin infusion process such as resin film infusion (RFI), resin transfer molding (RTM), or other processes. The polymer matrix fiber-reinforced material 106 may also comprise pre-impregnated fiber-reinforced polymeric material (e.g., pre-preg) as mentioned above.

Referring to FIG. 16, shown is an exploded sectional side view of a composite laminate 100 draped over the tool 200 and partially covering the tooling rod assembly 152. The tooling rod assembly 152 may be mounted to the tool 200 by means of one or more attachment devices 186 such as pressure-sensitive adhesive tape. The tape may be applied to the film edges 184 for bonding to the tool surface 208. The tooling rod assembly 152 may be positioned on the tool surface 208 such that the upper rod end 160 is within a predetermined distance of the tangent 216 of the corner radius 214. The upper rod end 160 may be tapered to accommodate a gradual increase in the amount of excess material that occurs along a direction toward the ply edge. In this regard, the maximum amount of excess ply material may be at a minimum at the corner radius 214 and a maximum at the ply edge 108.

In FIG. 16, the tooling rod assembly 152 may be configured and positioned such that the tooling rods 154 extend beyond the ply edge 108 as mentioned above. A plurality of composite plies 104 may be formed over or applied to the tool 200 to achieve a desired thickness of a composite laminate 100. A vacuum bag 224 may be sealingly applied over the composite laminate 100 and tooling rod assemblies 152 using a bag edge sealant 226. A vacuum (not shown) may be drawn on the vacuum bag 224 and internal compaction pressure 228 may be applied to the composite laminate 100 to force the composite plies 104 into a corrugated shape 170 as shown in FIG. 15.

Figure 17:
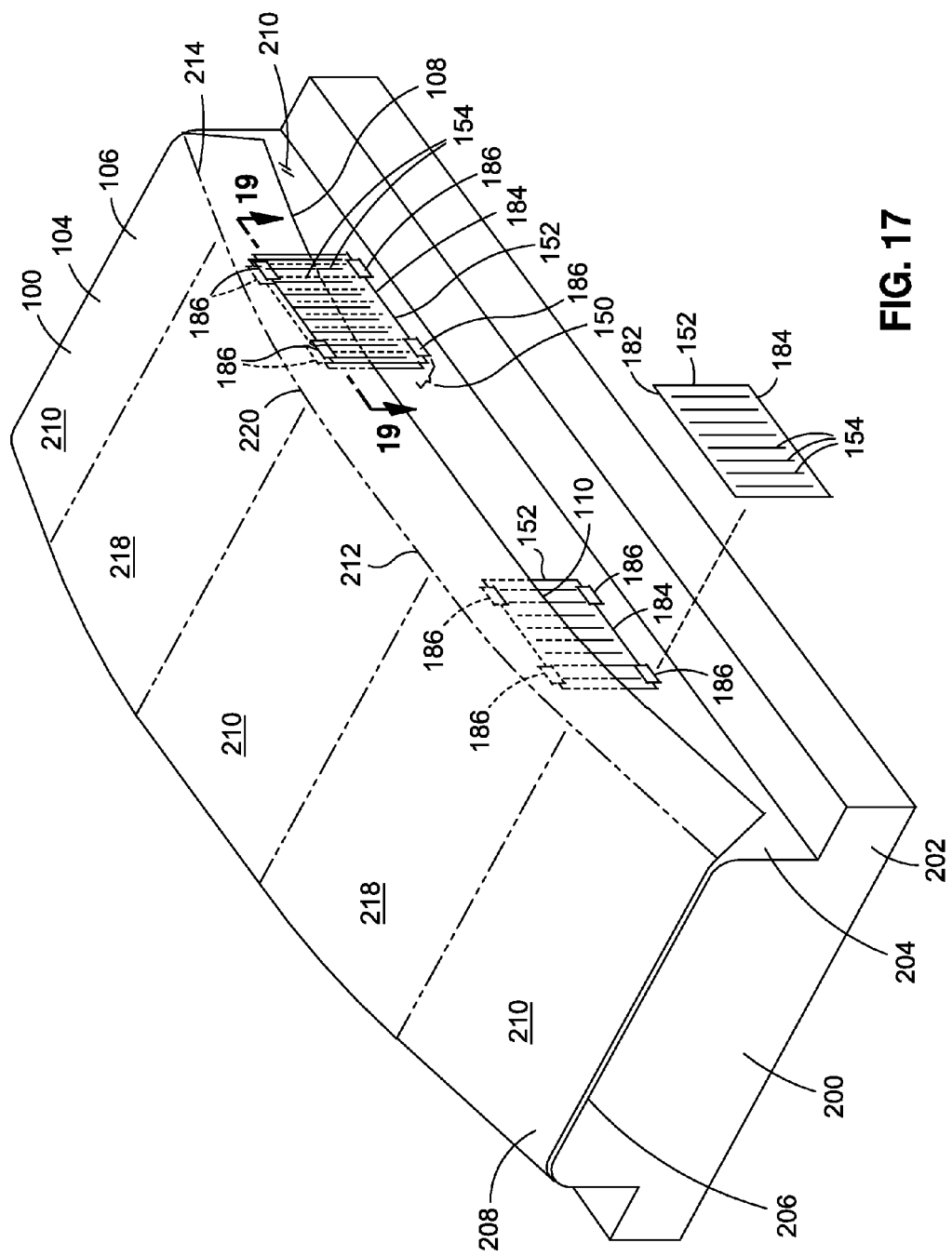
FIG. 17 is a perspective view of the tool illustrating an embodiment of the wrinkle mitigation system comprising a pair of the tooling rod assemblies for sandwiching a composite laminate therebetween.

Referring to FIG. 17, shown is an alternative embodiment of the wrinkle mitigation system 150 for generating a corrugated shape 170 in a composite ply 104 or composite laminate 100. At one or more locations on the tool 200, a pair of tooling rod assemblies 152 may be positioned on opposite sides of the composite ply 104 or composite laminate 100. The tooling rods 154 of one of the tooling rod assemblies 152 may be positioned to nest within the spaces between the tooling rods 154 of the opposing tooling rod assembly 152 as shown in FIGS. 19-22 described below. One of the tooling rod assemblies 152 may be mounted on the tool 200 such as adjacent to a region of complex curvature 220 such that the composite ply 104 or composite laminate 100 at least partially overlaps the tooling rod assembly 152.

In FIG. 17, the mating the tooling rod assembly 152 may be mounted over the composite ply 104 or composite laminate 100 in general registration with the tooling rod assembly 152 that is mounted to the tool 200. In this manner, the pair of tooling rod assemblies 152 may cooperate to force the composite ply 104 into a corrugated shape 170 to increase wrinkle mitigation. The tooling rod assembly 152 may be mounted over the composite laminate 100 using an attachment device 186 such as tape for securing individual tooling rods 154 or the film edges 184 of a tooling rod assembly 152 to the composite ply 104 or to a protective layer (not shown) that may be applied over the composite ply 104 or composite laminate 100.

Referring to FIG. 18, shown is a sectional view illustrating the pair of tooling rod assemblies 152 and a composite laminate 100 positioned therebetween prior to the application of compaction pressure 228 (FIG. 22) to the composite laminate 100. The tooling rod assemblies 152 may be positioned relative to one another such that the tooling rods 154 of one of the tooling rod assemblies 152 are aligned with the spaces between the tooling rods 154 of the opposing tooling rod assembly 152. A vacuum bag 224 (FIG. 22) may be applied over the pair of tooling rod assemblies 152 and composite laminate 100.

Referring to FIG. 19, shown is a sectional view of the tool 200 illustrating the corrugated shape 170 formed in the composite laminate 100 by the opposing pair of tooling rod assemblies 152. When compaction pressure 228 is applied such as by drawing a vacuum on the vacuum bag 224 applied over the tooling rod assemblies 152, the tooling rods 154 may force the composite laminate 100 toward the tool surface 208. In this manner, the tooling rod assemblies 152 may cooperate to increase the wrinkle mitigation capability of the wrinkle mitigation system 150.

Referring to FIG. 20-21, shown are sectional views of the tool 200 and a pair of tooling rod assemblies 152 with the composite laminate 100 positioned between the tooling rod assemblies 152 similar to the arrangement shown in FIGS. 18-19. The tooling rod assemblies 152 have a half-cone shape 163 which may facilitate the mounting of the tooling rods 154 to the tool surface 208. In addition, the half-cone shape 163 of the tooling rods 154 may facilitate vacuum bagging for applying compaction pressure to force the composite laminate 100 toward the tool surface in the space between each one of the tooling rods 154.

Referring to FIG. 22, shown is a partially exploded sectional side view of the tool 200 having a pair of tooling rod assemblies 152 positioned on opposite sides of a composite laminate 100. One of the tooling rod assemblies 152 may be mounted to the tool 200 by means of one or more attachment devices 186 such as pressure-sensitive adhesive tape as indicated above. The composite laminate may be applied over the tooling rod assembly 152. An additional tooling rod assembly 152 may be applied over the composite laminate 100 such that the composite-mounted tooling rod assembly 152 is in general registration with the tool-mounted tooling rod assembly 152 wherein the tooling rods 154 nest between one another as illustrated in FIGS. 18-21.

In FIG. 22, the laminate-mounted tooling rod assembly 152 may be secured in place using one or more attachment devices 186 (e.g. tape) as described above. A vacuum bag 224 may be applied over the tooling rod assemblies 152 and the composite laminate 100. The vacuum bag 224 may be sealed to the tool 200 using a bag edge sealant 226. A vacuum may be drawn on the vacuum bag 224 and internal compaction pressure 228 may be applied to force the tooling rod assemblies 152 together causing the composite laminate 100 to assume the corrugated shape 170 shown in FIGS. 19 and 21.

Figure 23:
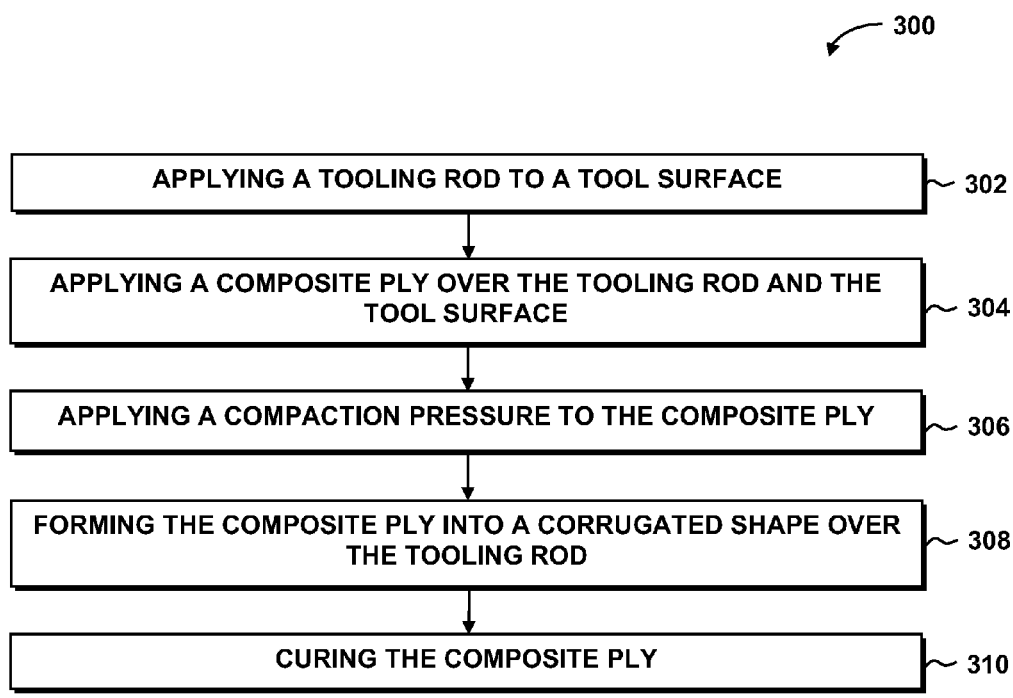
FIG. 23 is a flow diagram illustrating one or more operations that may be included in a method of controlling wrinkle formation in a composite laminate.

Referring to FIG. 23, shown is a flow diagram having one or more operations that may be included in a method 300 for mitigating wrinkle formation in a composite ply 104 or composite laminate 100. Advantageously, the method implements the use of one or more wrinkle mitigation systems 150 comprising one or more tooling rods 154 that may be disposed on a tool surface 208 for controlling the distribution of excess ply material 110 in a composite ply 104.

Step 302 of the method 300 of FIG. 23 may include applying at least one tooling rod 154 to a tool surface 208. As shown in FIG. 14, the tooling rod assembly 152 may have a plurality of tooling rods 154 that may be removably mounted to the tool surface 208 of the tool 200. In this regard, Step 302 may further include removably attaching the tooling rod 154 to the tool surface 208 using at least one attachment device 186 such as pressure-sensitive adhesive tape that may be applied over the film edges 184 of the protective film 182. The method may include applying one or more tooling rods 154 adjacent to regions of complex curvature 220. However, in an alternative embodiment, the method may include integrally forming the tooling rods 154 with the tool surface 208 such as by machining the tooling rods 154 into the tool surface 208 or molding the tooling rods 154 into the tool surface 208 as mentioned above. The method may include applying a protective film 182 over the tooling rod 154 prior to applying the composite ply 104 over the tool 200. The protective film 182 may act as a barrier between the tooling rods 154 and the composite ply 104.

The quantity of tooling rods 154 may be selected based upon the amount of excess material that may be expected to occur at a given location. The tooling rod assembly 152 may be sized and configured such that a corrugated shape 170 is formed in the composite ply 104 or composite laminate 100. In an embodiment, the tooling rods 154 may be provided at a substantially uniform spacing resulting in a corrugated shape 170 that provides substantially uniform distribution of excess ply material 110 of the composite ply 104. The method may include spacing the tooling rods 154 at a rod spacing 176 of between approximately 0.50 and 3.0 inch although the rods may be provided at any rod spacing.

The method may further include positioning a tooling rod 154 such that a rod end 160 is located within approximately one (1) inch of a tangent 216 of a corner radius 214 in the tool surface 208. Step 302 of the method 300 of FIG. 23 may include positioning the tooling rod 154 in a rod length 156 such that a portion of the tooling rod 154 extends outwardly beyond a ply edge 108 of the composite ply 104. The method may further include orienting the tooling rods 154 generally parallel with one another as illustrated in FIG. 14. However, the tooling rods 154 may be oriented in any relation to one another and are not limited to a parallel orientation.

The tooling rod assembly 152 may be sized and configured in a manner that minimizes the peak-to-peak amplitude 174 in a composite ply 104 as mentioned above. For example, the method may include sizing the tooling rods 154 to provide a peak-to-peak amplitude 174 of less than approximately 0.10 inch in a composite ply 104. In addition, the method may include sizing the tooling rod 154 in a rod width 158 that substantially eliminates the occurrence of uncontrolled wrinkle formation 112 in the composite ply 104 when compaction pressure 228 is applied to the composite ply 104. In this regard, the wrinkle mitigation system 150 advantageously provides for a substantially uniform distribution of excess ply material 110 within a corrugated shape 170 formed in the composite ply 104 or composite laminate 100.

Step 304 of the method 300 of FIG. 23 may include applying (e.g., draping) a composite ply 104 over the tooling rod 154 and the tool surface 208. In an embodiment, the method may preferably include hand layup of composite plies 104 over the tool 200 and tooling rod assemblies 152. However, the method may include the use of automated tape laying machinery such as a contoured tape laying machine for automated layup of composite plies 104 over the tool 200 and over the tooling rod assemblies 152 that may be mounted to the tool 200. In a further embodiment, a composite-mounted tooling rod assembly 152 may be applied over the composite laminate in general registration with a tool-mounted tooling rod assembly 152 as shown in FIG. 17. The tooling rod assemblies may cooperate to force the composite laminate into a corrugated shape (FIGS. 19 and 21) for improved wrinkle mitigation.

Step 306 of the method 300 of FIG. 23 may include applying compaction pressure 228 (FIG. 16) to the composite ply 104. In this regard, after the tooling rod assemblies 152 are mounted to the tool 200 and the desired quantity of composite plies 104 are formed over the tool surface 208 and the tooling rod assemblies 152, the vacuum bag 224 may be applied over the composite plies 104 to provide a gas barrier for drawing a vacuum (not shown). The drawing of the vacuum may result in the application of internal compaction pressure 228 on the composite plies 104 against the tool surface 208 and tooling rods 154.

Step 308 of the method 300 of FIG. 23 may include forming at least a portion of the composite ply 104 into a corrugated shape 170 over the tooling rods 154 as illustrated in FIG. 15. The corrugated shape 170 may substantially duplicate the size and spacing between them tooling rods 154. Advantageously, the corrugated shape 170 may cause excess ply material 110 to be distributed in a generally uniform manner. In this manner, the wrinkle mitigation system 150 provides a means for controlling excess ply material 110 by forming a plurality of significantly smaller size wrinkle instead of several relatively large uncontrolled pleats or folds (FIG. 3) that may occur without the wrinkle mitigation system 150.

Step 310 of the method 300 of FIG. 23 may include removing the tooling rod assemblies 152 from the tool surface 208 after forming the composite ply 104 or composite laminate 100 into the corrugated shape 170. The corrugated shape 170 may include relatively small channels 172 (FIG. 15) where the composite ply 104 overlaps or surrounds each one of the tooling rods 154. Step 310 may include the application of heat and/or additional compaction pressure 228 on the composite ply 104 during curing of the composite laminate 100 which may result in the channels 172 at least partially flattening to reduce the corrugation height which may minimize distortion of the fiber reinforcement of the cured composite article.

Advantageously, the system and method disclosed herein may provide a means for forming any one of a variety of sizes and configurations of composite articles having irregular shapes or with complex curvatures. In an embodiment, the composite article may comprise a structural component 102 such as a structural component of an aircraft. The structural component may comprise a component of an aircraft wing, an aircraft fuselage, an aircraft control surface, an engine nacelle, a spar, a rib, a frame, a stiffener, or any other structural component, without limitation. The wrinkle mitigation system 150 and method disclosed herein advantageously provides a low-cost solution to controlling wrinkle size and location which may improve the strength and performance of the cured composite article.

Figure 24:
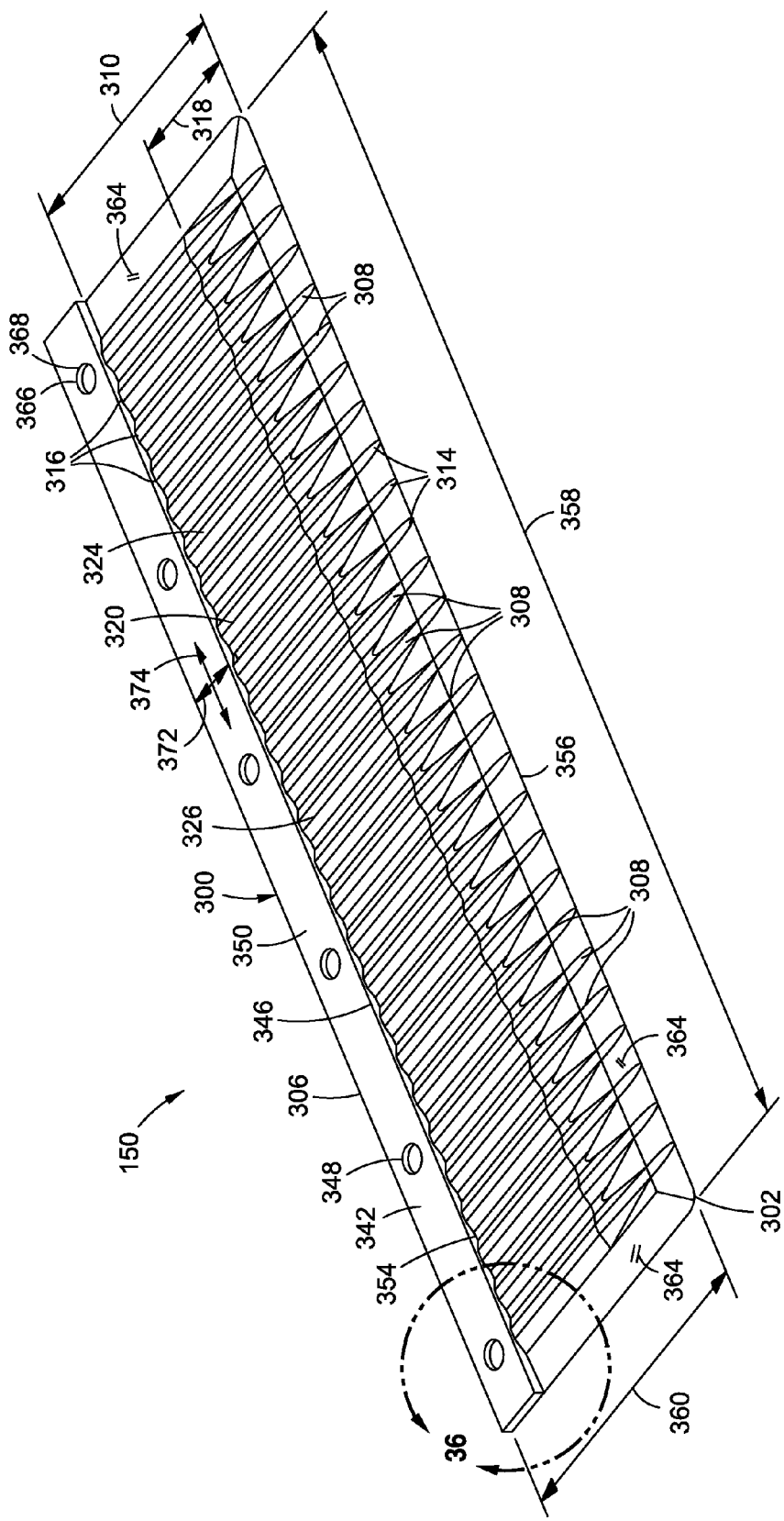
FIG. 24 is a perspective view of an example of a wrinkle diffuser having a plurality of diffuser elements forming a corrugated surface.

FIG. 24 is a perspective view of a further example of a wrinkle diffuser 300 that may be implemented for use in an embodiment of a wrinkle mitigation system 150 for diffusing wrinkles in a composite laminate 100. As indicated above, the composite laminate 100 may be comprised of composite plies 104 which may be uncured plies that may be pre-impregnated with polymeric matrix material (e.g., prepreg). However, the composite laminate 100 may be comprised of partially-cured composite plies 104 and/or the composite plies 104 may be dry fiber composite plies 104. The wrinkle diffuser 300 may be used in combination with another wrinkle diffuser 300 to capture or sandwich a region of a composite laminate 100 of ply 104 between a coupled pair of wrinkle diffusers 300.

The embodiment of the wrinkle diffuser 300 shown in FIG. 24 has a high degree of robustness and durability to withstand multiple uses. Furthermore, the embodiment of the wrinkle diffuser 300 includes a means for indexing the wrinkle diffuser 300 to a composite laminate 100 to control the orientation and positioning of the wrinkle diffuser 300 relative to the composite laminate 100. In addition, the embodiment shown in FIG. 24 may include one or more coupling features 366 for indexing the wrinkle diffusers 300 to one another such that the corrugated surfaces 324 of the coupled wrinkle diffusers 300 may be aligned with one another. The wrinkle diffuser 300 may include a diffuser body 306 having a diffuser body width 360, a diffuser body length 358, and a perimeter edge 356 extending around the diffuser body 306. In some examples, the diffuser body 306 may have a diffuser body length 358 in the range of from approximately one (1) inch to approximately 24 inches or greater, and a body width 360 in the range of from approximately one (1) inch to approximately 10 inches or greater.

The diffuser body 306 may have a diffuser surface 320 defined by a plurality of diffuser elements 308. In some examples, the diffuser elements 308 may be oriented generally parallel to one another. The diffuser elements 308 may be configured such that the diffuser surface 320 is a corrugated surface 324. In some examples, the diffuser elements 308 may be configured such that the corrugated surface 324 includes a plurality of parallel peaks 336 and troughs 334. In other examples, the diffuser elements 308 may be configured such that the corrugated surface 324 includes a plurality of peaks 336 separated by flat sections as shown in FIGS. 29-32 and described in greater detail below.

One or more of the wrinkle diffusers 300 may be positionable relative to a tool 200 (e.g., FIGS. 4 and 38) and may be oriented in a manner such that the diffuser elements 308 are oriented generally parallel to the natural direction of wrinkle formation (e.g., see FIGS. 1-2 and 13) in a composite ply 104 or composite laminate 100 that may be applied over the tool surface 208 of the tool 200. However, it may also be desirable to position one or more of the wrinkle diffusers 300 adjacent to regions of single curvature 212 (e.g., outside corners) in a tool 200 (e.g., see FIGS. 38-39) to avoid wrinkle formation due to excess ply material that may bunch up against the tool sides 204, as described in greater detail below. The corrugated surfaces 324 in the wrinkle diffusers 300 may absorb the excess ply material by forcing the composite laminate 100 against the corrugated surfaces 324 of the wrinkle diffusers 300 and forming a corrugated shape 170 (see FIG. 46) in the composite laminate 100 when compaction pressure is applied. In this manner, the wrinkle diffusers 300 may capture the excess composite material that may be generated during the process of draping or forming the composite laminate 100 over the curved surfaces of single curvature 212 or complex curvature 220.

Although the present disclosure describes the use of wrinkle diffusers 300 for absorbing excess composite material when draped over a male mold, the wrinkle diffusers 300 may also be implemented for use when applying composite material against a female mold (not shown) having one or more concave surfaces or inside corners of single curvature or complex curvature. Regardless of whether the wrinkle diffusers 300 are used for male molds or female molds, the wrinkle diffusers 300 provide a means for forming a corrugated shape 170 having a controlled and/or uniform wave pattern in the composite laminate 100 at known locations and at known heights. After forming, the corrugated shape 170 in the composite laminate 100 may be compacted to flatten out the corrugated shapes 170 in a controlled manner, and thereby mitigate or avoid the occurrence of uncontrolled wrinkling that may otherwise form in the composite laminate 100.

The wrinkle diffuser 300 may be formed of a material that is suitable for use in the forming and processing of composites. In one example, the wrinkle diffuser 300 may be formed of metallic and/or non-metallic material. For example, the wrinkle diffuser 300 may be formed of aluminum or other metallic material such as by machining, casting, or other process. The wrinkle diffuser 300 may be formed of a material that is chemically compatible with the composite laminate 100 when placed in direct contact therewith. However, the wrinkle diffuser 300 may be formed of a material that may not necessarily be chemically compatible with the composite laminate 100, and may be at least partially covered with a protective film or sheet of material that is chemically compatible with the composite laminate 100 to avoid direct contact between the wrinkle diffuser 300 and the composite laminate 100. The wrinkle diffuser 300 may also be formed of composite material such as fiber-reinforced polymer matrix material such as graphite-epoxy composite material or other composite material. In some examples, the diffuser body 306 and the diffuser elements 308 may be formed of composite material and may be co-bonded or co-cured to form a wrinkle diffuser 300. However, the wrinkle diffuser 300 may be formed of other non-metallic material such as ceramic material or polymeric material.

In one example, the wrinkle diffuser 300 may be formed of acrylonitrile butadiene styrene (ABS) material and which may be heat-treated to withstand the elevated temperatures associated with hot-draping of composite material over a tool 200. In some examples, the diffuser elements 308 and the diffuser body 306 may be integrally-formed of polymeric material using an additive manufacturing process. For example, the wrinkle diffuser 300 may be formed using stereo lithography, three-dimensional printing, laser sintering, and/or other manufacturing processes. In some embodiments, the diffuser body 306 and the diffuser elements 308 may be separately formed and then later assembled together by suitable means such as by mechanical fastening, chemical bonding, or other means.

In FIG. 24, the wrinkle diffuser 300 may include a base flange 342 extending along a lengthwise direction 374 of the diffuser body 306. The base flange 342 may provide a means for indexing the wrinkle diffuser 300 to a composite laminate 100. For example, the base flange 342 may include a base edge 346 to function as an indexing feature 348 for indexing the wrinkle diffuser 300 to a ply edge 108 of the composite laminate 100. In this regard, the indexing feature 348 may be an indexing surface 354 that may be oriented orthogonally relative to the mating surface 350 of the base flange 342. As described in greater detail below, the wrinkle diffuser 300 may be positioned such that the ply edge 108 of the composite laminate 100 is butted up against the indexing surface 354. The diffuser body 306 may be provided in a body width 306 that allows the perimeter edge 356 of the wrinkle diffuser 300 to be positioned at a desired distance from the tangent 216 of the corner radius 214 of the tool surface 208 when the ply edge 108 is butted up against the indexing surface 354, as described in greater detail below.

The wrinkle diffuser 300 may include one or more coupling features 366 for coupling a pair of the wrinkle diffusers 300 (e.g., an inner wrinkle diffuser 302 and an outer wrinkle diffuser 304) together and/or for indexing the position of the wrinkle diffusers 300 relative to one another along a lengthwise direction 374 and/or a widthwise direction 372 of the wrinkle diffusers 300. For example, the wrinkle diffuser 300 in FIG. 24 is shown having a generally planar mating surface 350 formed along a base flange 342 to facilitate the coupling of a pair of the wrinkle diffusers 300 together to form a desired gap 340 (see FIG. 35) between the corrugated surfaces 324 to accommodate the thickness of the composite laminate 100, as described in greater detail below. In one example, the wrinkle diffuser 300 as shown in FIG. 24 may include a plurality of magnets 370 that may be mounted within complementary-shaped bores 368 formed in the base flange 342. A mating wrinkle diffuser 300 may be provided with a complementary set of magnets 370 or magnetically attractive material to magnetically couple the wrinkle diffusers 300 (e.g., an inner wrinkle diffuser 302 coupled to an outer wrinkle diffuser) together while a composite laminate 100 is sandwiched therebetween, as described in greater detail below.

FIGS. 25-26 show a portion of a wrinkle diffuser 300 in an embodiment composed of diffuser elements 308 having a generally triangular cross-sectional shape 326. In some examples, the triangular diffuser elements 308 may be formed with generally straight sides. The diffuser elements 308 may each have an element length 310 extending from the base flange 342. In any one of the wrinkle diffuser 300 examples disclosed herein, the element tips 314 may terminate at the perimeter edge 356 of the diffuser body 306. In other examples, the element tips 314 may terminate at a location that is spaced away from the perimeter edge 356.

In the example shown, each one of the diffuser elements 308 may have a generally constant triangular cross-sectional shape 326 extending from the element base 316 up to an element taper 318. The element taper 318 may be formed adjacent to the element tip 314 of the diffuser elements 308 to provide a gradual transition in the height of the diffuser element down to the thickness of the diffuser body 306 at the perimeter edge 356. In FIG. 26, each one of the diffuser elements 308 may have an element width 312. In addition, the diffuser elements 308 may be spaced apart from one another according to a peak-to-peak distance 338. The diffuser elements 308 may be separated by a trough 334. In the example shown, the troughs 334 may have a rounded shape that may be similar to the rounded shape of the peaks 336 of the diffuser elements 308.

In any one of the wrinkle diffuser 300 embodiments disclosed herein, the element width 312 may be in the range of from approximately 0.050-1.0 inch or greater. In some examples of the wrinkle diffuser 300, each diffuser element 308 may have an element width 312 in a range of from approximately 0.050 to 0.50 inch or greater. In any embodiment disclosed herein, the peak-to-peak distance 338 may be in the range of from approximately 0.2-2 inch or greater. In some examples, the diffuser elements 308 may be spaced apart from one another at a peak-to-peak distance 338 of between approximately 0.50 and 1.0 inch or greater. In some examples, the diffuser elements 308 may have an element length 310 to element width 312 aspect ratio of at least 10.

Although the disclosed embodiments illustrate the diffuser elements 308 of each wrinkle diffuser 300 having the same size, cross-sectional shape, configuration, and length, it is contemplated that a wrinkle diffuser 300 may be provided with diffuser elements 308 that have different cross-sectional sizes, cross-sectional shapes, configurations, and/or element lengths. For example, although not shown, a wrinkle diffuser 300 may be formed such that on each side of the opposing lengthwise ends of the diffuser body 306, the diffuser elements 308 with a smaller cross-sectional size (e.g., peak height) than the interiorly-located diffuser elements 308 which may have a larger cross-sectional size or peak height. Such an arrangement may result in forming a corrugated shape 170 in the composite laminate 100 with corrugations 190 that are generally tapered or gradually reduced in height along a direction from an interior portion of the corrugated shape 170 to the opposing lengthwise ends of the corrugated shape 170. In a further example, the diffuser elements 308 at the opposing lengthwise ends of the diffuser body 306 may have a shorter length than the interiorly-located diffuser elements 308. In such an arrangement, the wrinkle diffuser 300 may not necessarily have a rectangular profile as shown in FIG. 24, but instead may have an upper perimeter edge 356 that has an arch shape. In this regard, the diffuser body 306 may be provided in any profile shape, and is not limited to the generally rectangular shape described herein and illustrated in the figures.

In FIG. 25, the diffuser body 306 may include a base flange 342 which may have an indexing feature 348 for indexing the wrinkle diffuser 300 to the ply edge 108 of a composite laminate 100. As indicated above, the indexing feature 348 may be an indexing surface 354 located adjacent to the element bases 316. A mating feature may be formed in the base flange 342. For example, the base flange 342 may include one or more bores 368, each of which may be configured to receive at least one magnet 370. The magnets 370 may be positioned in a manner corresponding to the location of a similar set of magnets that may be provided with a mating wrinkle diffuser 300. Alternatively, the mating wrinkle diffuser 300 may be provided with magnetically attractive material for magnetic coupling with the magnets 370 of the other wrinkle diffuser 300.

Figure 33:
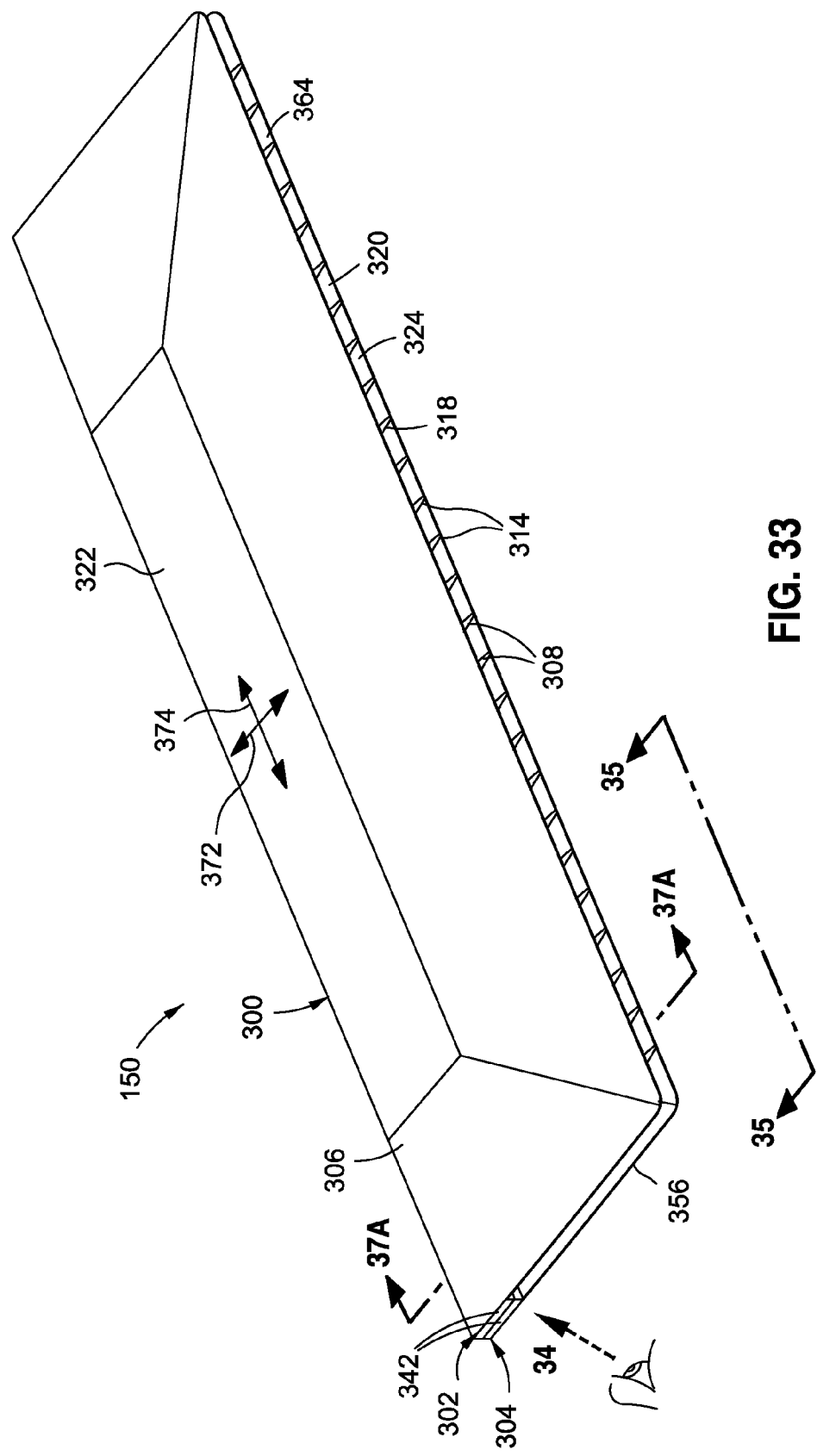
FIG. 33 is a perspective view of an inner wrinkle diffuser coupled to an outer wrinkle diffuser along the base flange of each one of the wrinkle diffusers.

In FIG. 26, shown is a sectional view of the diffuser body 306 illustrating the corrugated surface 324 formed by the diffuser elements 308. For an inner wrinkle diffuser 302 mounted between the tool surface 208 and the composite laminate 100 (see FIG. 40), the diffuser body 306 may include a back surface 322 which may be generally flat and/or planar for direct or indirect mounting against a generally planar tool surface 208. For an outer wrinkle diffuser 304 (see FIG. 42), the back surface 322 may have a generally increased thickness in an interior region of the diffuser body 306 and may taper 364 to a reduced thickness along the perimeter edges 356 of the diffuser body 306 as shown in FIG. 33.

FIGS. 27-28 show a portion of a wrinkle diffuser 300 in an embodiment composed of diffuser elements 308 forming the corrugated surface 324 in a sine wave cross-sectional shape 330. In FIG. 27, the wrinkle diffuser 300 may be configured such that the diffuser elements 308 extend from the element base 316. The element tips 314 may terminate at the perimeter edge 356 of the diffuser body 306. As indicated above, one or more of the diffuser elements 308 may include an element taper 318 along which the diffuser elements 308 may gradually decrease in height down to the thickness of the diffuser body 306 at the perimeter edge 356. By including an element taper 318 in the diffuser elements 308, the wrinkle diffuser 300 may have increased flexibility along the perimeter edges 356 to allow the perimeter edge 356 to bend under compaction pressure. By allowing the perimeter edge 356 to flex or bend under compaction pressure, the magnitude of the compaction pressure on the composite laminate 100 may be less concentrated along the perimeter edge 356 which may prevent the undesirable occurrence of indentations or mark-off in the surface of the composite laminate 100. By avoiding mark-off, the strength and/or appearance of the composite laminate 100 may be improved. In FIG. 28, shown is a cross-sectional view of the diffuser body 306 illustrating the corrugated surface 324 formed into the sine wave cross-sectional shape 330. The diffuser elements 308 may be formed with a generally rounded cross-sectional shape 328 at the peak 336 and a rounded cross-sectional shape 328 in the troughs 334 such that the diffuser elements 308 collectively formed the sine wave cross-sectional shape 330 in the corrugated surface 324 of the wrinkle diffuser 300.

FIGS. 29-30 show a portion of a wrinkle diffuser 300 with diffuser elements 308 that result in the corrugated surface 324 having in an extended sine wave cross-sectional shape 332. One or more of the diffuser elements 308 may include an element taper 318 along which the diffuser elements 308 decrease in height along a direction toward the perimeter edge 356, as mentioned above. FIG. 30 is a sectional view of the diffuser body 306 showing the extended sine wave cross-sectional shape 332 of the corrugated surface 324. As can be seen, each one of the diffuser elements 308 may have a generally rounded cross-sectional shape 328 and may be separated from one another by a flat section.

FIGS. 31-32 show a portion of a wrinkle diffuser 300 with diffuser elements 308 having a semi-circular cross-sectional shape. As described above with regard to the other wrinkle diffuser 300 embodiments, each one of the diffuser elements 308 may include an element taper 318. In FIG. 32, each one of the diffuser elements 308 may have a semi-circular cross-sectional shape. The diffuser elements 308 may be separated by a flat section similar to the flat sections formed in the extended sine wave cross-sectional shape 332 shown in FIG. 30.

In any one of the wrinkle diffuser 300 embodiments disclosed herein, the diffuser elements 308 may be provided in any element width 312, element length 310, cross-sectional shape, and/or diffuser element 308 configuration, without limitation, and are not limited to the diffuser element 308 configuration shown in the figures. The diffuser elements 308 may be configured such that the corrugated surface 324 of each one of the wrinkle diffusers 300 has a sine wave cross-sectional shape 330. The sine wave cross-sectional shape 330 may have a substantially constant waveform and amplitude (e.g., measured peak-to-trough) along a lengthwise direction 374 of the corrugated surface 324. In some examples described above, the corrugated surface 324 may have an extended sine wave cross-sectional shape 332 with relatively small radius in the peaks 336 and relatively large radius troughs 334 or flat sections between the peaks 336.

FIG. 33 shows an inner wrinkle diffuser 302 and an outer wrinkle diffuser 304 coupled together. The inner wrinkle diffuser 302 may have a corrugated surface 324 on one side of the wrinkle diffuser 300 and a generally planar or flat back surface 322 on an opposite side of the wrinkle diffuser 300. The outer wrinkle diffuser 304 may have a corrugated surface 324 that may be configured complementary to the corrugated surface 324 of the inner wrinkle diffuser 302. The outer wrinkle diffuser 304 may have a back surface 322 that may have an increased body thickness 362 (FIG. 37A) in an interior region of the outer wrinkle diffuser 304 and along the base flange 342 of the outer wrinkle diffuser 304. The body thickness 362 may taper 364 to a reduced body thickness 362 along the perimeter edges 356 to reduce the occurrence of mark-off in a composite laminate 100, as described above.

The inner wrinkle diffuser 302 and the outer wrinkle diffuser 304 may be removably coupled to one another with the composite ply 104 sandwich therebetween as shown in FIGS. 42-45 and described below. As indicated above, the outer wrinkle diffuser 304 may have a corrugated surface 324 configured complementary to the corrugated surface 324 of the inner wrinkle diffuser 302 such that the center of the peaks 336 of the corrugated surface 324 of the outer wrinkle diffuser 304 are aligned in parallel arrangement with the center of the troughs 334 or flat sections of the corrugated surface 324 of the inner wrinkle diffuser 302. As indicated above, the inner and outer wrinkle diffuser 302, 304 may have substantially similar diffuser body lengths 358 and diffuser body widths 360, and may have substantially matching waveform and amplitude of the corrugated surfaces 324. The wavelength of the corrugated surfaces 324 may be offset such that the peaks 336 of the corrugated surface 324 of the outer wrinkle diffuser 304 are aligned with (e.g., are substantially parallel to) and are laterally aligned (e.g., within 0.10 inch or less) with the troughs 334 of the corrugated surface 324 of the inner wrinkle diffuser 302 such that a substantially uniform gap 340 (FIG. 35) is provided between the corrugated surfaces 324 along the length and width of the coupled inner and outer wrinkle diffuser 302, 304. In some examples, the diffuser elements 308 may be sized and configured such that when the composite ply 104 is sandwiched between a mated pair of wrinkle diffusers 300, the gap 340 between the corrugated surfaces 324 is substantially equivalent to a thickness of the composite ply 104 to within a predetermined tolerance such as, for example, to within approximately 0.010 inch or less.

FIG. 34 is an end perspective view of an inner and outer wrinkle diffuser 302, 304 coupled together. One or both of the inner and outer wrinkle diffusers 302, 304 may include a coupling feature 366 to allow for coupling of the wrinkle diffusers 302, 304 to provide the desired gap 340 to accommodate the thickness of the composite laminate 100. In the embodiment shown, the coupling feature 366 may comprise a base flange 342 on each one of the wrinkle diffusers 302, 304. Each base flange 342 may have a generally planar mating surface 350.

In FIG. 35, shown is a sectional view of the inner and outer wrinkle diffuser 302, 304 coupled together. The mating surfaces are in abutting contact with one another. Each base flange 342 may have a thickness that provides a desired height 352 of the mating surface 350 above the peaks 336 of the diffuser elements 308. In this regard, the height 352 of the mating surface 350 above the peaks 336 may be such that the corrugated surfaces 324 are spaced apart from one another at a gap that is substantially equivalent to the thickness of the composite laminate 100.

Figure 36:
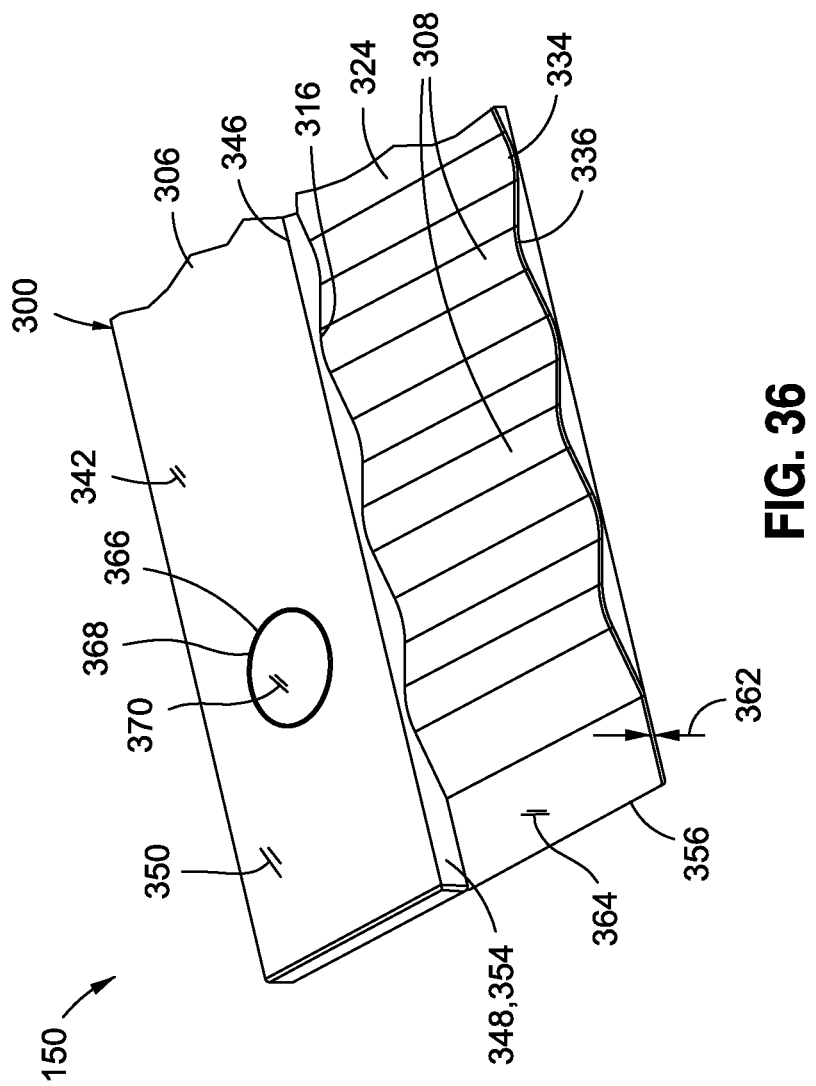
FIG. 36 is a perspective view of a portion of a wrinkle diffuser showing a coupling feature formed in the base flange of the wrinkle diffuser.

FIG. 36 shows a portion of a wrinkle diffuser 300 including a base flange 342. As was indicated earlier, one or both of the wrinkle diffusers 300 may include an indexing feature 348 such as an indexing surface 354 formed on the base flange 342. By including the indexing surface 354, the wrinkle diffuser 300 may be positioned relative to the composite laminate 100 by abutting the indexing surface 354 against the ply edge 108. Also shown is a coupling feature 366 formed in the base flange 342 of the wrinkle diffuser 300. As indicated above, each one of the wrinkle diffusers 300 may include one or more coupling features 366 to facilitate assembly of the inner wrinkle diffuser 302 with the outer wrinkle diffuser 304. In the embodiment shown, the coupling feature 366 may comprise one or more magnets 370 that may be received within a corresponding quantity of bores 368 formed in the base flange 342. In some examples, the coupling feature 366 may act as an alignment feature to position the inner and outer wrinkle diffuser 302, 304 relative to one another along a lengthwise direction 374 and a widthwise direction 372.

FIG. 37A shows an embodiment of an inner and outer wrinkle diffuser 302, 304 coupled to one another by means of magnets 370 installed within the bores 368 in the base flanges 342 of each one of the inner and outer wrinkle diffuser 302, 304. Each one of the bores 368 may be formed at a depth such that the magnet 370 is flush with the mating surface 350. Alternatively, one of the wrinkle diffusers 300 may be provided with magnets 370 and the other one of the wrinkle diffusers 300 may be provided with magnetically-attractive material for magnetic coupling of the inner and outer wrinkle diffuser 302, 304. As may be appreciated, any number of a variety of different mechanisms may be configured for coupling the inner and outer wrinkle diffuser 302, 304. For example, the inner and outer wrinkle diffuser 302, 304 may be coupled using a mechanical fastening mechanism (not shown) or any other type of coupling mechanism, without limitation.

FIG. 37B shows an alternative embodiment of the inner and outer wrinkle diffuser 302, 304 wherein the magnet 370 protrudes outwardly from the mating surface 350. The protruding magnet 370 may be received within a hollow bore 368 formed in the base flange 342 of the outer wrinkle diffuser 304. In this regard, the arrangement shown in FIG. 37B provides a mechanism for fixing the relative position of the inner and outer wrinkle diffuser 302, 304 in a lengthwise direction 374 and a widthwise direction 372 such that the peaks 336 of the corrugated surface 324 in the inner wrinkle diffuser 302 are aligned with the troughs 334 in the corrugated surface 324 of the outer wrinkle diffuser 304.

The side sectional views of FIGS. 37A-37B illustrate the thickness profile of the diffuser body 306 of the inner and outer wrinkle diffuser 302, 304. The inner and/or outer wrinkle diffuser 302, 304 may have a body thickness 362 that may be tapered toward one or more of the perimeter edges 356, as indicated above. For example, the diffuser body 306 of either one or both of the inner and outer wrinkle diffuser 302, 304 may include a taper 364 along the perimeter edge 356 on one or more sides (e.g., the lengthwise side and/or the widthwise side) of the diffuser body 306. In some examples, the body thickness 362 in an interior region of the diffuser body 306 may be less than approximately 0.50 inch and may be down to 0.020 inch or less. In other examples, the body thickness 362 of the diffuser body 306 of the inner and/or outer wrinkle diffuser 302, 304 may taper 364 down to a thickness of approximately 0.005 inch or less along the perimeter edges 356. As indicated above, for an outer wrinkle diffuser 304, the diffuser body 306 may have an increased body thickness 362 at an interior region of the diffuser body 306 relative to the body thickness 362 of the inner wrinkle diffuser 302. The increased body thickness 362 in the interior region of the outer wrinkle diffuser 304 may improve the stiffness and/or strength of the diffuser body 306. The taper 364 may provide flexibility along the perimeter edges 356.

FIG. 38 shows a planar composite laminate 100 positioned above a tool 200 which has corner radii 214 joining the tool top 206 to the tool sides 204. The tool top 206 may have a planar surface 210 or the tool top 206 may have a slightly bowed or convex tool surface 208 and which may result in the corner radii 214 having a complex curvature 220 and resulting in excess composite material (e.g., see FIGS. 1-3) collecting along the tool sides 204. The excess composite material may result in the uncontrolled formation of wrinkles along the tool sides 204 similar to the occurrence of wrinkles in the composite laminate 100 as shown in FIG. 2 and described above. Although not shown, the direction of wrinkle formation in the composite laminate 100 may be generally perpendicular to the lengthwise direction of the corner radius 214 along the tool 200.

FIG. 39 shows the composite laminate 100 draped over the tool 200 and a pair of inner wrinkle diffusers 302 prior to installation between the composite laminate 100 and the tool sides 204. In some examples, the back surface 322 of the inner wrinkle diffuser 302 may have a generally planar shape for mounting against the generally planar shape of the tool 200 side. As indicated above, each one of the wrinkle diffusers 300 may include one or more indexing features 348. In some examples, the indexing feature 348 for each one of the wrinkle diffusers 300 may be an indexing surface 354 formed in a lengthwise direction 374 along the base flange 342 of each one of the wrinkle diffusers 300. However, the indexing feature 348 for each one of the wrinkle diffusers 300 may be provided in any one a variety of different configurations, and is not limited to a indexing surface 354. For example, although not shown, each wrinkle diffuser 300 may be provided with a raised portion or boss which may be configured to engage the ply edge 108 of the composite laminate 100 as a means to control the depth to which the wrinkle diffuser 300 is inserted from the ply edge 108 of the composite laminate 100.

In some examples, the indexing feature 348 may be provided as a series of indexing protrusions (not shown) formed on the diffuser body 306 and configured to be positioned against or butted up against the ply edge 108. Although the wrinkle diffuser 300 disclosed herein is shown having a generally straight indexing surface 354 for abutting a generally straight ply edge 108 of a composite laminate 100, it is contemplated that the inner and/or outer wrinkle diffuser 302, 304 may include indexing feature(s) 348 configured to accommodate a curved or non-straight ply edge (not shown). In this regard, such indexing features 348 may be arranged to substantially duplicate the shape of the ply edge 108.

FIG. 40 shows one of the inner wrinkle diffusers 302 installed between the composite laminate 100 and one of the tool sides 204. In some examples, the inner wrinkle diffuser 302 may be removably attached to the tool surface 208 using one or more attachment devices 186 such as pressure-sensitive adhesive, a mechanical attachment mechanism, a magnetic attachment mechanism, or other mechanism. In some examples, the inner wrinkle diffuser 302 may be held in position by pressure-sensitive adhesive tape (see FIG. 43). In the embodiment shown, the wrinkle diffuser 300 may be centrally-positioned between the opposing ends of the tool 200. However, the wrinkle diffuser 300 may be biased toward one end of the tool 200 depending upon the location of the uncontrolled wrinkles that may form in the composite laminate 100 as a result of being draped over the tool 200. In some examples, multiple wrinkle diffusers 300 may be located at spaced intervals along a ply edge 108. Each one of the wrinkle diffusers 300 may be inserted between the composite laminate 100 and the tool side 204 and may be pushed upwardly until the ply edge 108 contacts the indexing surface 354 of the base flange 342. In some examples, the wrinkle diffuser 300 may have a diffuser body width 360 such that the uppermost perimeter edge 356 is positioned in relatively close proximity to the tangent 216 line of the corner radius 214, while not extending beyond the tangent 216 line. As discussed in greater detail below, locating the perimeter edge 356 in close proximity to the tangent 216 line of the corner radius 214 may reduce or prevent the formation of wrinkles that may otherwise occur if the perimeter edge 356 were located at a relatively large distance (e.g., greater than approximately 0.5 inch) from the tangent 216 line.

FIG. 41 shows a pair of outer wrinkle diffusers 304 positioned on opposite sides of the tool 200 prior to coupling each one of the outer wrinkle diffusers 304 to a corresponding one of the inner wrinkle diffusers 302. Each one of the inner wrinkle diffusers 302 and/or outer wrinkle diffusers 304 may include one or more coupling mechanisms for coupling the inner and outer wrinkle diffusers 302, 304. As indicated above, the base flange 342 of the inner and outer wrinkle diffuser 302, 304 may include one or more magnets 370. In some examples, the magnets may be mounted within bores 368 formed in the base flange although the magnets may be mounted to the base flange in any manner and are not limited to being mounted in bores. The magnets 370 may be configured to mechanically couple with corresponding magnets 370 mounted to the mating wrinkle diffuser 300 or to magnetically-attractive material mounted on or incorporated into the mating wrinkle diffuser 300. However, any one of a variety of different types of coupling features 366 may be implemented for coupling the inner and outer wrinkle diffusers 302, 304 and the wrinkle mitigation system 150 is not limited to the use of magnets 370 for magnetic coupling the wrinkle diffusers 300. The coupling feature 366 may also be a mechanical device or system such as a mechanical latching mechanism (not shown), a mechanical fastener (not shown), or other mechanism configured to allow for removably coupling the inner and outer wrinkle diffuser 302, 304. The coupling feature 366 may also be a non-mechanical feature. For example, the coupling feature 366 may be a temporary adhesive bond such as double-side adhesive tape or a releasable adhesive film applied between the mating surfaces 350 of the base flange 342 of the inner wrinkle and outer wrinkle diffuser 302, 304.

Figure 42:
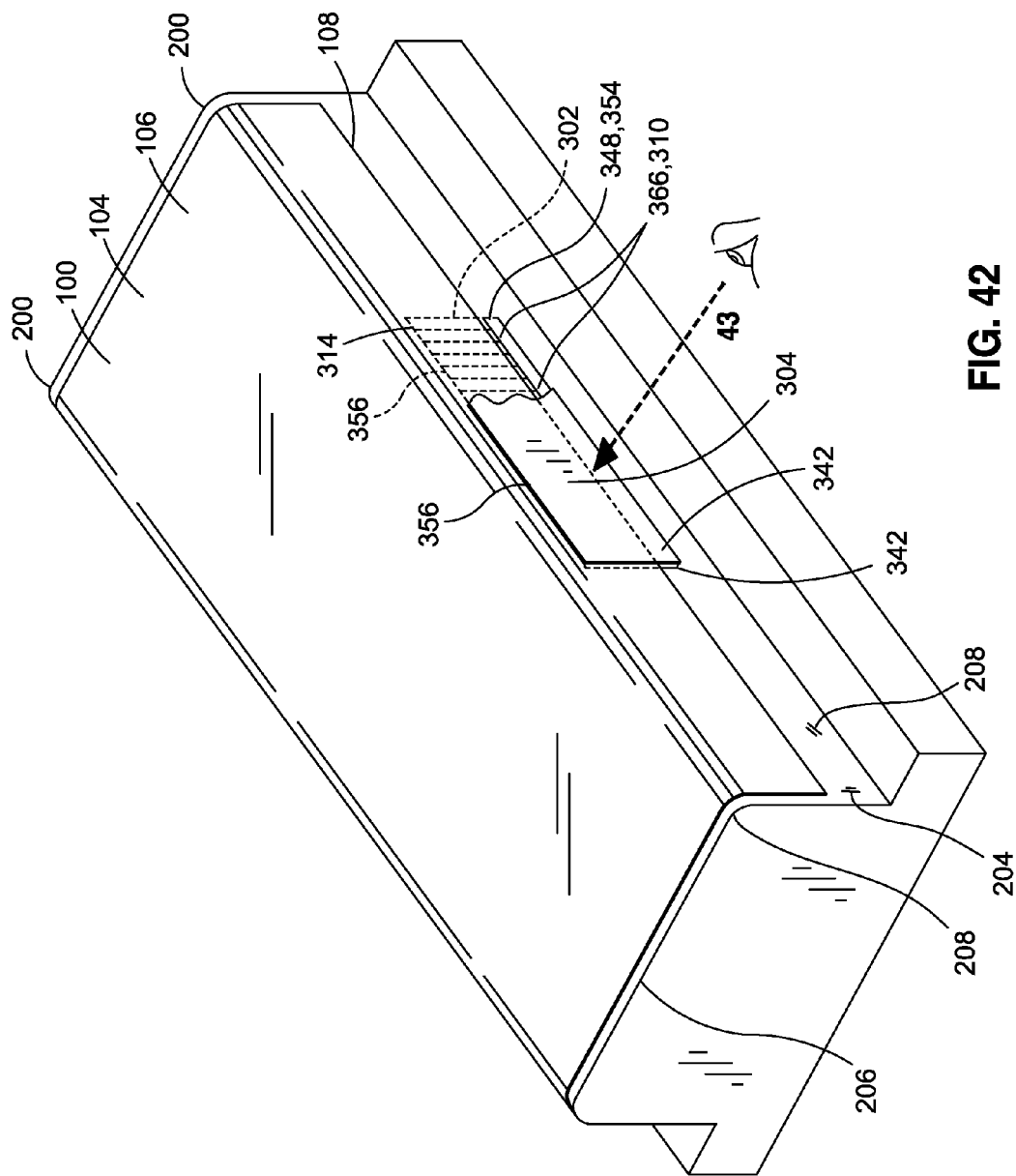
FIG. 42 is a perspective view of an outer wrinkle diffuser coupled to an inner wrinkle diffuser on one side of the tool.

FIG. 42 shows an outer wrinkle diffuser 304 coupled to an inner wrinkle diffuser 302 on one side of the tool 200. The base flange 342 of the outer wrinkle diffuser 304 may have a mating surface 350 that may be placed in direct contact with the mating surface 350 of the base flange 342 on the inner wrinkle diffuser 302 such that the composite laminate 100 is sandwiched between the inner and outer wrinkle diffuser 302, 304. The indexing surface 354 on the outer wrinkle diffuser 304 may be placed in abutting contact with the ply edge 108 as may the indexing surface 354 of the inner wrinkle diffuser 302. In this manner, the indexing surface 354 may control the location of the element tips 314 relative to the tangent 216 line of the corner radius 214. The inner and outer wrinkle diffuser 302, 304 may be sized and configured such that when the wrinkle diffusers 300 are indexed to the ply edge 108, the element tips 314 terminate at a desired distance from the tangent 216 of the corner radius 214 which, in some examples, may be no further than approximately 0.5 inch from the tangent 216 line of the corner radius 214. In some examples, the diffuser body width 360 and the location of the indexing feature(s) 348 may be such that the element tips 314 terminate at approximately the location of the tangent 216 line.

FIG. 43 shows a side view of the inner and outer wrinkle diffuser 302, 304 with the composite laminate 100 sandwiched therebetween. The inner wrinkle diffuser 302 may be secured to the tool 200 by means of one or more attachment devices 186 which may be pressure-sensitive adhesive tape. The outer wrinkle diffuser 304 may be coupled to the inner wrinkle diffuser 302 using coupling features 366 such as magnets 370 installed in the inner and/or outer wrinkle diffuser 302, 304. The coupling features 366 may also provide for aligning the outer wrinkle diffuser 304 with the inner wrinkle diffuser 302 in a lengthwise direction 374 and/or in a widthwise direction 372. As can be seen, the inner and outer wrinkle diffuser 302, 304 may be sized and configured such that the uppermost perimeter edge 356 and the element tips 314 are located on or substantially near the tangent 216 line of the corner radius 214 to improve the effectiveness at mitigating wrinkles and to prevent the occurrence of wrinkling in the composite laminate 100 in a region between the perimeter edge 356 and the tangent 216 line.

FIG. 44 is a top sectional view showing the composite laminate 100 sandwiched between the corrugated surfaces 324 of the inner and outer wrinkle diffuser 302, 304. As shown, the corrugated surfaces 324 of the inner and outer wrinkle diffusers 302, 304 may be aligned with one another due to the arrangement of the coupling feature 366. For example, the peaks 336 of the outer wrinkle diffuser 304 may be aligned with the troughs 334 of the inner wrinkle diffuser 302 due to the coupling feature 366 that may be included with the inner and/or outer wrinkle diffuser 302, 304. Also shown is the taper 364 in the thickness of the diffuser body 306 of the inner and/or outer wrinkle diffuser 302, 304 along the perimeter edges 356 to prevent the occurrence of mark-off in the composite laminate 100.

Figure 45:
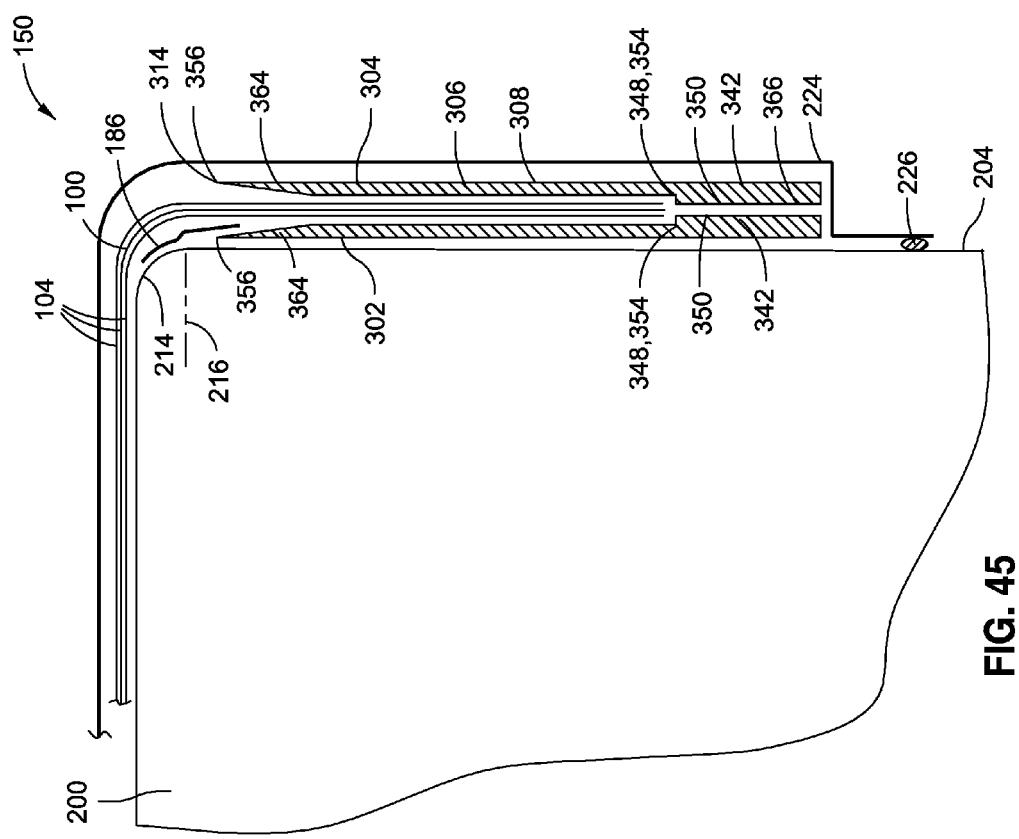
FIG. 45 an exploded sectional side view taken along line 45 of FIG. 43 and illustrating the composite layup sandwiched between the inner and outer wrinkle diffuser.

FIG. 45 is a partially exploded sectional side view of the tool 200 and the composite laminate 100 sandwiched between the inner and outer wrinkle diffuser 302, 304. As indicated above, the inner wrinkle diffuser 302 may be attached to the tool surface 208 by means of one or more attachment devices 186 such as pressure-sensitive adhesive tape. The composite laminate 100 may be draped over the tool 200 such that the ply edge 108 is in abutting contact with the indexing surface 354 of the inner wrinkle diffuser 302. The outer wrinkle diffuser 304 may be applied over the composite laminate 100. The mating surfaces of the inner and outer wrinkle diffuser 302, 304 may be placed in abutting contact with one another. The base flanges 342 of the inner and outer wrinkle diffuser 302, 304 may be coupled together such as by using the magnets 370 shown in FIG. 43 or by using one or more other coupling features 366. A vacuum bag 224 may be applied over the inner and outer wrinkle diffusers 302, 304 and the vacuum bag 224 may be sealed to the tool surface 208 using a bag edge sealant 226. A vacuum may be drawn on the vacuum bag 224 to cause the application of compaction pressure on the outer wrinkle diffuser 304 to debulk the composite laminate 100 while simultaneously forming a corrugated shape 170 into the portion of the composite laminate 100 sandwiched between the inner and outer wrinkle diffuser 302, 304.

Figure 46:
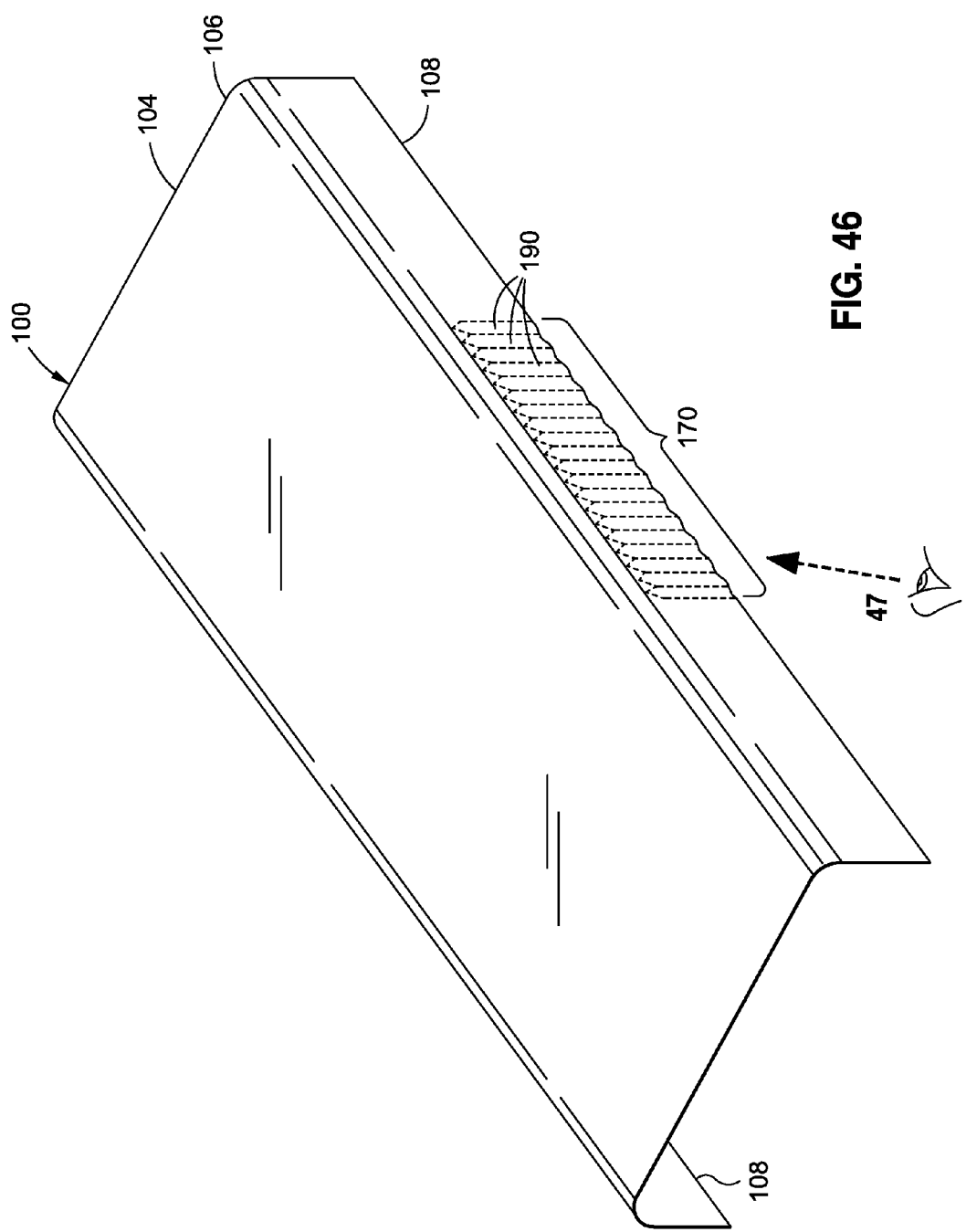
FIG. 46 is a perspective view of the composite layup showing a corrugated shape formed in the location where the inner and outer diffusers clamp the composite layup.

FIG. 46 shows the composite laminate 100 after removal from the tool 200 and the inner and outer wrinkle diffuser 302, 304. The composite laminate 100 may include a corrugated shape 170 formed in the location where the inner and outer diffusers clamped the composite laminate 100. The corrugated shape 170 may have a uniform wave pattern. In some examples, after debulking the composite laminate 100, the corrugated shape 170 may be smoothed out to reduce the height of the corrugations by applying a caul plate (not shown) over the area of the corrugated shape 170.

Figure 47:
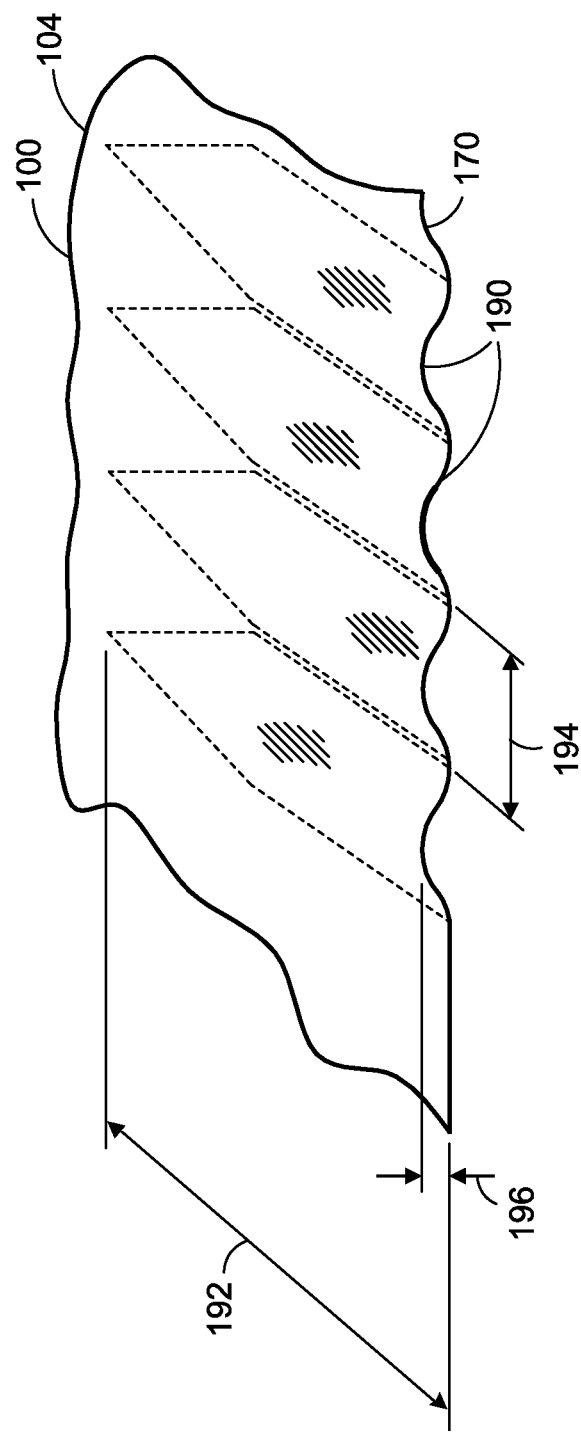
FIG. 47 is a perspective view of a portion of the corrugated shape formed in the composite layup.

FIG. 47 is a perspective view of a portion of the corrugated shape 170 formed in the composite laminate 100. Depending upon the arrangement of the corrugated surfaces 324 in the of the inner and outer wrinkle diffusers 302, 304, the corrugated shape 170 may include corrugations 190 that are formed at a substantially constant aspect ratio of corrugation length 192 to corrugation width 194. In addition, the corrugations 190 may have a corrugation height 196 that may be substantially constant along the ply edge 108. Depending upon the arrangement of the corrugated surfaces 324, the corrugations 190 may taper in height along a direction of the corrugation length 192.

Figure 48:
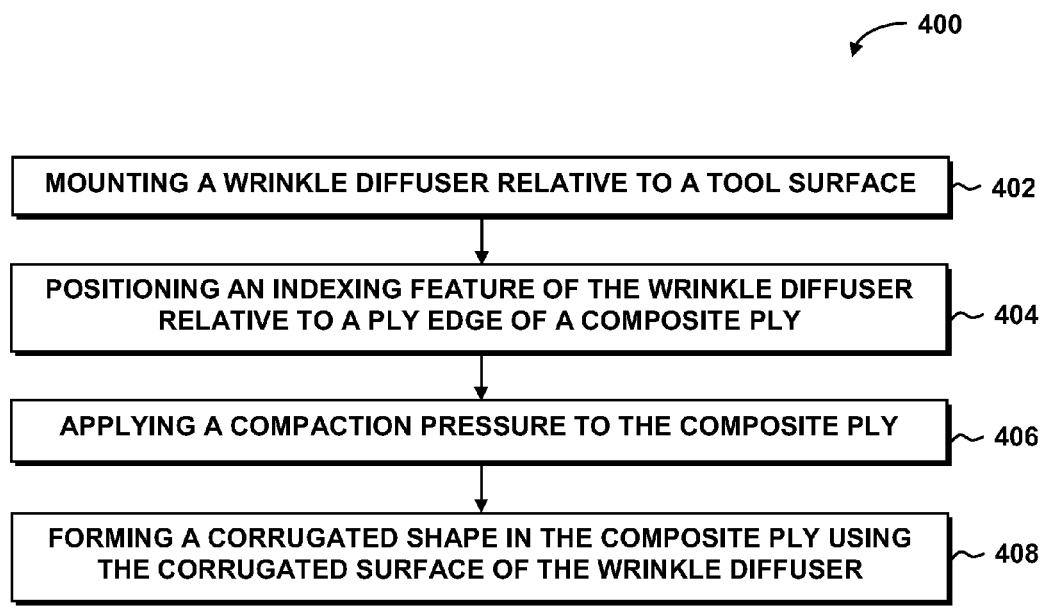
FIG. 48 is a flowchart showing one or more operations that may be included in a method of forming a corrugated shape in a composite layup.

FIG. 48 is a flowchart showing one or more operations that may be included in a method of forming a corrugated shape 170 (e.g., FIGS. 46-47) in a composite laminate 100. Step 402 of the method 400 may include mounting a wrinkle diffuser 300 relative to a tool surface 208. For example, FIGS. 39-40 illustrate a pair of inner wrinkle diffusers 302 installed between a composite laminate 100 and a tool surface 208. In one example, the inner wrinkle diffusers 302 may be attached to the tool surface 208 by using an attachment device 186 such as the adhesive tape as shown in FIGS. 43 and 45.

Step 404 of the method 400 may include positioning an indexing feature 348 of the inner wrinkle diffuser 302 relative to a ply edge 108 of the composite ply 104. The method may include positioning the inner wrinkle diffuser 302 at a location of a convex curvature on the tool 200, and/or at a location where excess ply material may (FIGS. 5 and 40). In addition, the method may include positioning the inner wrinkle diffuser 302 on the tool 200 such that a perimeter edge 356 of the diffuser body 306 is no further than approximately one (1) inch from a tangent 216 line of the tool surface 208. In a preferable embodiment, the wrinkle diffuser 300 may be positioned such that the perimeter edge 356 and/or the element tips 314 of the diffuser elements 308 are located no further than approximate one-half inch from the tangent 216 line of the corner radius 214 in order to reduce or prevent the formation of natural wrinkles in the composite laminate 100 in the space between the tangent 216 line and the perimeter edge 356 of the inner wrinkle diffuser 302. In a further embodiment, the wrinkle diffuser 300 may be positioned such that the perimeter edge 356 and/or the element tips 314 are located substantially on the tangent 216 line.

FIGS. 40 and 45 illustrate the positioning of an indexing surface 354 of the diffuser body 306 against the ply edge 108 of the composite laminate 100 as a means to locate the inner wrinkle diffuser 302 relative to the composite laminate 100. As indicated above, the inner and outer wrinkle diffuser 302, 304 may include other types of indexing features 348 for indexing the inner wrinkle diffuser 302 with the composite laminate 100, and are not limited to use of an indexing surface 354. For example, the inner wrinkle diffuser 302 may include a series of indexing protrusions (not shown) which may be formed on the diffuser body 306 and may be positioned against or butted up against the ply edge 108. Regardless of their configuration, the indexing features 348 may be arranged to substantially duplicate the shape of the ply edge 108. For example, if the ply edge 108 is straight, the indexing features 348 may be provided in a straight configuration. If the ply edge 108 is curved (not shown), the indexing features 348 may be provided in a curved configuration (not shown) to match the curved ply edge 108.

The method may include removably coupling an outer wrinkle diffuser 304 to an inner wrinkle diffuser 302 such that the composite ply 104 is sandwiched therebetween as shown in FIGS. 41-45. In some examples, the method may include removably coupling the outer wrinkle diffuser 304 to the inner wrinkle diffuser 302 using a coupling feature 366 such as a temporary adhesive bond, a mechanical device, or other types of coupling feature 366. In one embodiment, the coupling feature 366 may include one or more bores 368 formed in the base flange 342 of the inner wrinkle diffuser 302 and/or outer wrinkle diffuser 304. Each one of the bores 368 may be sized and configured to receive a magnet 370. The magnets 370 in the inner and outer wrinkle diffuser 302, 304 may be flush with the mating surface 350 as shown in FIG. 37A or, in an alternative embodiment, either the inner wrinkle diffuser 302 or the outer wrinkle diffuser 304 may include magnets 370 that protrude from the bores 368 in the base flange 342 and which may be received in the corresponding empty bores 368 of the base flange 342 of the mating wrinkle diffuser 300 as shown in FIG. 37B. In some examples, the empty bores 368 may include magnetically attractive material for magnetically coupling to the magnets 370. Regardless of the specific configuration, the coupling feature 366 may provide a means for coupling the inner and outer wrinkle diffuser 302, 304 and may also provide a means for aligning the peaks 336 of the outer wrinkle diffuser 304 with the troughs 334 of the inner wrinkle diffuser, as shown in FIG. 44.

Step 406 of the method 400 may include applying compaction pressure to the composite ply 104 after vacuum bagging the composite laminate 100 and wrinkle diffusers 300. For example, FIG. 45 shows the composite laminate 100 sandwiched between the inner and outer wrinkle diffuser 302, 304. A vacuum bag 224 is applied over the layup assembly and may be sealed to the tool surface 208 such as by using a bag edge sealant 226 such as tacky tape or other material for providing an airtight seal of the vacuum bag 224 against the tool surface 208. A vacuum may be drawn on the vacuum bag 224 to allow for the application of compaction pressure. The compaction pressure may debulk the composite laminate 100, and may also force the corrugated surfaces 324 of the inner and outer wrinkle diffuser 302, 304 into the composite laminate 100 which, in turn, may generate a corrugated shape 170 in the composite laminate 100. In some examples, heat and/or external pressure may be applied in order to enhance the debulking of the composite laminate 100 and/or to enhance the forming of the corrugated shape 170 in the composite laminate 100.

Step 408 of the method 400 may include forming the corrugated shape 170 into the composite ply 104 as a result of the application of compaction pressure. After forming the corrugated shape 170, the method may further include removing the inner and outer wrinkle diffuser 302, 304 from the tool 200. The composite laminate 100 may also be removed from the tool 200. FIG. 46 shows the corrugated shape 170 formed along a portion of the composite laminate 100 at the location where the inner and outer wrinkle diffuser 302, 304 were clamped onto the composite laminate 100. In some examples, the method may include applying compaction pressure to the corrugated shape 170 following the removal of the inner and outer wrinkle diffuser 302, 304 as a means to flatten the corrugations 190 formed in the composite ply 104. For example, the method may include mounting the composite laminate 100 on the tool 200, and applying a caul plate (not shown) over the corrugated shape 170. Pressure may be applied over the caul plate as a means to reduce the trough-to-peak corrugation height 196 of the corrugations 190 in the corrugated shape 170. The method may further include applying heat or pressure to cure the composite laminate 100 in order to form a composite article.

It should be noted that although the present disclosure describes the use of a pair of wrinkle diffusers 300 (e.g., an inner wrinkle diffuser 302 and an outer wrinkle diffuser), a single wrinkle diffuser 300 may be implemented for use in forming a corrugated shape 170 into a portion of a composite ply 104. For example, an inner wrinkle diffuser 302 may be inserted between the tool surface 208 and a composite laminate 100, and compaction pressure may be applied over the composite laminate 100 via a vacuum bag 224 to force the composite laminate 100 into a corrugated shape 170. The vacuum bag 224 may be removed and a caul plate or other means may be applied over the corrugated shape 170 to reduce the height of the corrugations 190 in the composite laminate 100.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for diffusing wrinkles in a composite laminate, comprising:
    at least one wrinkle diffuser including a diffuser body and configured to be mounted to a tool in a manner such that a composite ply at least partially overlaps the at least one wrinkle diffuser, the diffuser body including:
        a plurality of diffuser elements formed in the diffuser body and defining a corrugated surface, the corrugated surface causing a portion of the composite ply to assume a corrugated shape when a compaction pressure is applied to force the composite ply against the corrugated surface, the plurality of diffuser elements being arranged in a manner that the corrugated surface has a cross-sectional shape having a series of parallel ridges; and
        a base flange formed along a lengthwise perimeter edge of the diffuser body, the base flange having a base edge oriented non-parallel to corrugations in the corrugated surface of the diffuser body and configured to be placed in direct contact with a ply edge of the composite ply for indexing the at least one wrinkle diffuser to the ply edge.

2. The system of claim 1, wherein:
    the series of parallel ridges forms a sine wave cross-sectional shape of the corrugated surface.

3. The system of claim 1, wherein the plurality of diffuser elements have at least one of a following:
    a triangular cross-sectional shape; and
    a rounded cross-sectional shape.

4. The system of claim 1, wherein:
    the at least one wrinkle diffuser includes an inner wrinkle diffuser and an outer wrinkle diffuser configured to be removably coupled to one another with the composite ply sandwiched therebetween; and
    the outer wrinkle diffuser having a corrugated surface configured complementary to the corrugated surface of the inner wrinkle diffuser such that peaks of the corrugated surface of the outer wrinkle diffuser are aligned with troughs of the corrugated surface of the inner wrinkle diffuser.

5. The system of claim 4, wherein:
    at least one of the inner wrinkle diffuser and the outer wrinkle diffuser includes a coupling feature configured to removably couple the outer wrinkle diffuser to the inner wrinkle diffuser.

6. A system for diffusing wrinkles in a composite laminate, comprising:
    an inner wrinkle diffuser and an outer wrinkle diffuser configured to be removably coupled to one another with at least one composite ply sandwiched therebetween;
    each one of the inner wrinkle diffuser and the outer wrinkle diffuser including a diffuser body having a plurality of diffuser elements defining a corrugated surface;
    the inner wrinkle diffuser configured to be mounted to a tool in a manner such that the at least one composite ply at least partially overlaps the inner wrinkle diffuser;
    the corrugated surface of the outer wrinkle diffuser configured complementary to the corrugated surface of the inner wrinkle diffuser such that peaks of the corrugated surface of the outer wrinkle diffuser are aligned with troughs of the corrugated surface of the inner wrinkle diffuser;
    the corrugated surface of the inner wrinkle diffuser and the outer wrinkle diffuser causing a portion of the at least one composite ply to assume a corrugated shape when a compaction pressure is applied to the outer wrinkle diffuser;
    at least one of the inner wrinkle diffuser and the outer wrinkle diffuser having an indexing feature configured to index the at least one of the inner wrinkle diffuser and the outer wrinkle diffuser to a ply edge of the composite ply; and
    at least one magnet mounted to the diffuser body of at least one of the inner wrinkle diffuser and the outer wrinkle diffuser and configured to be magnetically coupled to a remaining one of the at least one of the inner wrinkle diffuser and the outer wrinkle diffuser.

7. The system of claim 1, wherein:
    the plurality of diffuser elements are sized and configured such that when the composite ply is sandwiched between a mated pair of wrinkle diffusers of the at least one wrinkle diffuser, a gap between the corrugated surfaces is substantially equivalent to a thickness of the composite ply.

8. A wrinkle mitigation system for diffusing wrinkles in a composite ply, comprising:
    an inner wrinkle diffuser configured to be mounted on a tool surface and including a corrugated surface defined by a plurality of diffuser elements;
    an outer wrinkle diffuser having a corrugated surface formed complementary to the corrugated surface of the inner wrinkle diffuser;
    the corrugated surface of the inner and outer wrinkle diffuser defining a gap sized to receive a composite laminate for forming a corrugated shape into the composite laminate when a compaction pressure is applied thereto;
    a coupling feature configured to removably couple the outer wrinkle diffuser to the inner wrinkle diffuser in alignment with one another such that peaks of the corrugated surface of the outer wrinkle diffuser are substantially aligned with troughs of the corrugated surface of the inner wrinkle diffuser; and
    the inner and outer wrinkle diffuser each having a diffuser body having a base flange formed along a lengthwise perimeter edge of the diffuser body, the base flange of the inner and outer wrinkle diffuser each having a base edge configured to be butted up against an edge of the composite laminate for respectively indexing the inner and outer wrinkle diffuser to the edge of the composite laminate.

9. A method of controlling wrinkle formation in a composite ply, comprising the steps of:
    mounting a wrinkle diffuser relative to a tool surface in a manner such that a composite ply at least partially overlaps the wrinkle diffuser, the wrinkle diffuser having a diffuser body including a plurality of diffuser elements forming a corrugated surface, the plurality of diffuser elements being arranged in a manner that the corrugated surface has a cross-sectional shape having a series of parallel ridges, the diffuser body including a base flange formed along a lengthwise perimeter edge of the diffuser body, the base flange having a base edge oriented non-parallel to corrugations in the corrugated surface;

placing the base edge directly against a ply edge of the composite ply to index the wrinkle diffuser to the ply edge;

applying a compaction pressure to the composite ply in a manner forcing the composite ply against the corrugated surface; and forming a corrugated shape in a portion of the composite ply in response to forcing the composite ply against the corrugated surface.

10. The method of claim 9, wherein the step of mounting the wrinkle diffuser and applying compaction pressure includes:

coupling an outer wrinkle diffuser to an inner wrinkle diffuser such that the composite ply is sandwiched therebetween; and applying the compaction pressure to the outer wrinkle diffuser and the composite ply to form the corrugated shape into the composite ply using the inner and outer wrinkle diffuser.

11. The method of claim 10, wherein the step of coupling the outer wrinkle diffuser to the inner wrinkle diffuser includes:

aligning peaks of the corrugated surface of the outer wrinkle diffuser with troughs of the corrugated surface of the inner wrinkle diffuser.

12. The method of claim 10, wherein the step of coupling the outer wrinkle diffuser to the inner wrinkle diffuser includes:

removably coupling the outer wrinkle diffuser to the inner wrinkle diffuser using a coupling feature included with at least one of the inner and outer wrinkle diffuser.

13. The method of claim 12, wherein the step of removably coupling the outer wrinkle diffuser to the inner wrinkle diffuser includes:

magnetically coupling the outer wrinkle diffuser to the inner wrinkle diffuser.

14. The method of claim 10, wherein the step of positioning the inner wrinkle diffuser includes:

positioning the inner wrinkle diffuser at a location of a corner radius on the tool.

15. The method of claim 10, wherein the step of positioning the inner wrinkle diffuser includes:

positioning the inner wrinkle diffuser on the tool such that a perimeter edge of the diffuser body is no further than approximately one inch from a tangent of the tool surface.

16. The method of claim 9, further comprising:

removing the wrinkle diffuser from the tool and the composite ply; and applying compaction pressure to the composite ply to flatten the corrugated shape in the composite ply; and curing the composite ply.

17. The method of claim 9, further comprising:

applying a caul plate over the composite ply to at least cover a portion of the corrugated shape; and reducing a trough-to-peak height of the corrugated shape using the caul plate.

18. The method of claim 9, wherein the step of mounting the wrinkle diffuser relative to the tool surface comprises:

positioning the wrinkle diffuser at a location of a convex curvature on the tool.

19. The method of claim 9, wherein the step of mounting the wrinkle diffuser relative to the tool surface comprises:

mounting the wrinkle diffuser to the tool surface using pressure-sensitive adhesive tape.

20. The method of claim 9, wherein:

the diffuser elements are each tapered at a location adjacent to a perimeter edge of the diffuser body.

21. The system of claim 6, wherein:

the corrugated surface of the inner wrinkle diffuser and the outer wrinkle diffuser has a sine wave cross-sectional shape.

22. The wrinkle mitigation system of claim 8, wherein:

the corrugated surface of the inner wrinkle diffuser and the outer wrinkle diffuser has a sine wave cross-sectional shape.

\* \* \* \* \*